(12) United States Patent
Izu et al.

(10) Patent No.: US 8,533,483 B2
(45) Date of Patent: Sep. 10, 2013

(54) DATA PROCESSING APPARATUS AND DIGITAL SIGNATURE METHOD

(75) Inventors: Tetsuya Izu, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/884,476

(22) Filed: Sep. 17, 2010

(65) Prior Publication Data

US 2011/0072278 A1    Mar. 24, 2011

(30) Foreign Application Priority Data

Sep. 18, 2009 (JP) .................. 2009-216437

(51) Int. Cl.
*H04L 29/06* (2006.01)

(52) U.S. Cl.
USPC .......................................... 713/180

(58) Field of Classification Search
None
See application file for complete search history.

(56) References Cited

U.S. PATENT DOCUMENTS

| | | | |
|---|---|---|---|
| 2007/0050713 A1 | 3/2007 | Yoshioka et al. | |
| 2007/0168671 A1 | 7/2007 | Takenaka et al. | |
| 2009/0193256 A1* | 7/2009 | Takenaka et al. | 713/176 |
| 2009/0199010 A1* | 8/2009 | Hakuta et al. | 713/176 |

FOREIGN PATENT DOCUMENTS

| | | |
|---|---|---|
| JP | 2006-60722 A | 3/2006 |
| JP | 2007-213549 A | 8/2007 |
| WO | WO-2006-008847 | 1/2006 |

OTHER PUBLICATIONS

Miyazaki, Kunihiko et al., "Digitally Signed Document Sanitizing Scheme from Bilinear Maps", The 2005 Symposium on Cryptography and Information Security Maiko Kobe, Japan, Jan. 25-28, 2005.*
Yoshioka, Takashi et al., "Proposal on Partial Integrity Assurance Technology that Considers", Forum on Information Technology, Sep. 7-9, 2004 (FIT 2004 (3rd Forum on Information Technology)), pp. 231-232.
Japanese Office Action mailed Jun. 25, 2013, and corresponding to Patent Application No. 2009-216437; Partial Translation.
Tetsuya Izu et al.,"On Construction of Sanitizable and Deletable Signature based on Content Extractable Signature Scheme", Extended Abstracts for the 2009 Symposium on Cryptography and Information Security (SCIS2009), Symposium on Cryptography and Information Security 2009 Secretariat, Jan. 20, 2009, 3B2-1, pp. 1-6. For a statement of relevance, refer to Partial Translation of Japanese Office Action mailed Jun. 25, 2013, and corresponding to Patent Application No. 2009-216437 submitted herewith.

* cited by examiner

*Primary Examiner* — Philip Chea
*Assistant Examiner* — Kendall Dolly
(74) *Attorney, Agent, or Firm* — Fujitsu Patent Center

(57) ABSTRACT

A data processing apparatus includes, an input unit to accept information on one or more deletion-target data blocks specified from a plurality of data blocks, a hash generating unit to calculate a hash value of each of the plurality of data blocks, an auxiliary data generating unit to calculate auxiliary data $\beta=g^{H1} \pmod{N}$ of a signer based on predetermined values g and N and a product H1 of the hash values of one or more deletion-target data blocks, a digital signature generating unit to calculate intermediate data $\alpha=g^{H2} \pmod{N}$ based on the predetermined values g and N and a product H2 of the hash values of one or more remaining data blocks to generate a digital signature for a combination of the intermediate data $\alpha$ and position data of one or more deletion-target data blocks with a signing key of a modifier.

9 Claims, 22 Drawing Sheets

Related-Art

Related-Art

Related-Art

Related-Art

Related-Art (1) $m_1 \longrightarrow h_1 \longrightarrow \alpha_{modifier2} = g^{h1} \bmod N$ $D_{modifier2}\{3\}$ $\sigma_{modifier2}$ (2) $\beta_{modifier1}{}^{h1}$ $\sigma_{modifier1}$ $D_{modifier1}\{2, 4\}$ (3) $\beta_{signer}{}^{h1} \longleftrightarrow \sigma_{signer}$

FIG. 10

|  | DATA BLOCK | SIGNATURE | HASH VALUE | AUXILIARY DATA |
|---|---|---|---|---|
| RELATED ART 2 | 4 | 3 | 12 | 0 |
| RELATED ART 3 | 4 | 3 | 3 | 0 |
| EMBODIMENT | 1 | 3 | 0 | 2 |

DATA PROCESSING APPARATUS AND DIGITAL SIGNATURE METHOD

CROSS-REFERENCE TO RELATED APPLICATION

This application is based upon and claims the benefit of priority of the prior Japanese Patent Application No. 2009-216437, filed on Sep. 18, 2009, the entire contents of which are incorporated herein by reference.

FIELD

The embodiments discussed herein relate to a data management technology capable of identifying modifiers.

BACKGROUND

As a technology for verifying the integrity of electronic documents (the documents are only an example and the integrity verification targets do not have to be documents), a technology using digital signatures is developed. Digital signature technology guarantees the integrity of each electronic document (i.e., preservation of content) by attaching a digital signature to an electronic document and authenticating the generator of the electronic document.

Accordingly, digital signature technology is very useful to prevent unauthorized users from making unauthorized alterations. However, the digital signature technology causes difficulty in the efficient utilization of the electronic documents because an alternation of content of an electronic document made by a modifier, i.e., a user authorized to alter the content of the electronic document, invalidates the digital signature attached to an electronic document, and the invalid digital signature does not guarantee the integrity of the modified electronic document.

Even if the electronic document includes confidential or unnecessary information, the modifier has difficulty in modifying, such as deleting, such information in the electronic document, which drastically degrades user convenience. When a new electronic document excluding confidential or unnecessary information is generated and newly attached with a digital signature, a signer has to generate the signature every time when generating a new electronic document, which is a burden on the signer. Accordingly, a technology is desired that allows unnecessary information to be deleted from electronic documents and guarantees the integrity of the electronic documents without new signatures generated by signers.

For example, a known digital signature technology (a first related art) called a deletable signature technology divides an electronic document into sub-documents and attaches digital signatures to the original electronic document and each sub-document to achieve deletion of a confidential sub-document. The deletable signature technology can guarantee the integrity of a disclosed part of an electronic document and the confidentiality of a confidential part, and thus can increase convenience of the electronic document.

A digital signature technology (a second related art) is also known that divides an electronic document into sub-documents, calculates a hash value for each sub-document, and prompts a signer and a modifier to attach their signatures to a set of the hash values to realize deletion of confidential sub-documents. This digital signature technology can guarantee the integrity of disclosed parts of the electronic document and the confidentiality of confidential parts (i.e., deleted parts), and thus can increase convenience of the electronic document.

Now, a method for deleting a confidential sub-document based on the second related art will be described. FIG. 1 illustrates an overview of signature generation processing based on the second related art. A signer divides an electronic document into a plurality of sub-documents $m_1$ to $m_4$ (or a plurality of originally divided sub-documents $m_1$ to $m_4$ may be used), calculates hash values $h_1$ to $h_4$ for the sub-documents $m_1$ to $m_4$ respectively, and determines a value resulting from concatenation of the hash values $h_1$ to $h_4$. The signer then generates a signature $\sigma_{signer}$ for the concatenated value of the hash values $h_1$ to $h_4$. The signer sends the electronic document, the concatenated value of the hash values $h_1$ to $h_4$, and the digital signature $\sigma_{signer}$ to a next user before terminating the processing. Data enclosed in rectangles as disclosed in FIG. 1 is sent.

FIG. 2 illustrates an overview of processing by a first modifier. Upon receiving the electronic document, the concatenated value of the hash values $h_1$ to $h_4$, and the digital signature $\sigma_{signer}$ from the signer, the first modifier specifies one or more sub-documents to be deleted (e.g., the sub-documents $m_2$ and $m_4$ in FIG. 2) and modifies contents of the sub-documents $m_2$ and $m_4$ to identifiers of the sub-documents $m_2$ and $m_4$ (e.g., character strings "2" and "4" in FIG. 2), respectively. The first modifier then calculates hash values $h_1$, $H_2$ (for the character string of "2"), $h_3$, and $H_4$ (for the character string of "4") of each sub-document. The first modifier determines a concatenated value of the hash values and generates a digital signature $\sigma_{modifier1}$ for the concatenated hash value. Thereafter, the first modifier sends the modified electronic document including the sub-documents $m_1$ and $m_3$ and the character strings "2" and "4", the concatenated value of the hash values $h_1$, $H_2$, $h_3$, and $H_4$, the digital signature $\sigma_{modifier1}$ of the first modifier, the concatenated value of the hash values $h_1$, $h_2$, $h_3$, and $h_4$, and the digital signature $\sigma_{signer}$ of the signer to a next user before terminating the processing. Data enclosed in rectangles as shown in FIG. 2 is sent.

FIG. 3 illustrates an overview of processing by a second modifier. Upon receiving the modified electronic document, the concatenated hash value and the digital signature of the first modifier, and the concatenated hash value and digital signature of the signer from the first modifier, the second modifier specifies one or more sub-documents to be deleted (e.g., the sub-document $m_3$ in FIG. 3) and modifies content of the sub-document to an identifier of the sub-document (e.g., a character string "3" in FIG. 3). The second modifier then calculates hash values $h_1$, $H_2$, $H_3$, and $H_4$ for the corresponding sub-documents to determine a concatenated value of the hash values and generates a digital signature $\sigma_{modifier2}$ for the concatenated hash value. Thereafter, the second modifier sends the modified electronic document including the sub-document $m_1$ and the character strings "2" to "4", the concatenated value of the hash values $h_1$ and $H_2$-$H_4$ and the digital signature $\sigma_{modifier2}$ of the second modifier, the concatenated value of the hash values $h_1$, $H_2$, $h_3$, and $H_4$ and the digital signature $\sigma_{modifier1}$ of the first modifier, and the concatenated value of the hash values $h_1$ to $h_4$ and the digital signature $\sigma_{signer}$ of the signer to a next user before terminating the processing. Data enclosed in rectangles as shown in FIG. 3 is sent.

FIG. 4 illustrates an overview of processing by a verifier. The verifier receives, from the second and last modifier, the modified electronic document including the sub-document $m_1$ and the character strings "238", "3", and "4", the concatenated value of the hash values $h_1$ and $H_2$-$H_4$ and the digital signature $\sigma_{modifier2}$ of the second modifier, the concatenated value of the hash values $h_1$, $H_2$, $h_3$, and $H_4$ and the digital signature $\sigma_{modifier1}$ of the first modifier, and the concatenated value of the hash values $h_1$ to $h_4$ and the digital signature $\sigma_{signer}$ of the signer. The verifier then calculates a hash value of each sub-document of the modified electronic document (1). After confirming that the concatenated value of the calculated hash values matches the concatenated hash value of the second modifier, the verifier verifies the second modifier's digital signature for the concatenated hash value (2). The verifier then verifies the first modifier's digital signature for the concatenated hash value of the first modifier to determine the integrity of the concatenated hash value (3). The verifier further verifies the signer's digital signature for the concatenated hash value of the signer to determine the integrity of the concatenated hash value (4). The verifier then compares the concatenated hash value of the signer with those of the modifiers to identify the modifier who has deleted each sub-document. More specifically, a comparison between the concatenated hash value of the signer and that of the first modifier reveals that the first modifier has deleted the sub-documents $m_2$ and $m_4$. Furthermore, a comparison between the concatenated hash value of the first modifier and that of the second modifier reveals that the second modifier has deleted the sub-document $m_3$.

In this way, the digital signature technology according to the second related art permits sub-documents to be deleted, the integrity of remaining sub-documents to be verified, and modifiers having deleted each sub-document to be identified. However, to realize such a function, the signer and the modifier have to calculate and output hash values in proportion to the number of sub-documents. As a result, the verifier processes the number of hash values in proportion to the number of sub-documents and the number of modifiers (more specifically, a×(n+1) hash values when the number of sub-documents and the number of modifiers are represented as "a" and "n", respectively). Accordingly, the second related art unfortunately decreases data transfer efficiency.

In contrast, in a third related art, the concatenated hash values are not sent. More specifically, as illustrated in FIG. 5, a signer divides an electronic document into a plurality of sub-documents $m_1$ to $m_4$ (or a plurality of sub-documents $m_1$ to $m_4$ originally divided from an electronic document may be used), calculates hash values $h_1$ to $h_4$ of the sub-documents $m_1$ to $m_4$ respectively, and determines a concatenated value of the hash values $h_1$ to $h_4$. The signer then generates a signature $\sigma_{signer}$ for the concatenated value of the hash values $h_1$ to $h_4$. The signer sends the electronic document including the sub-documents $m_1$ to $m_4$ and the digital signature $\sigma_{signer}$ to a next user.

Upon receiving the electronic document and the digital signature $\sigma_{signer}$ from the signer, a first modifier deletes, for example, the sub-documents $m_2$ and $m_4$. The first modifier modifies contents of the sub-documents $m_2$ and $m_4$ to identifiers of the sub-documents $m_2$ and $m_4$ (e.g., character strings "2" and "4" in FIG. 5), respectively. The first modifier then calculates hash values $h_1$, $H_2$ (for the character string "2"), $h_3$, and $H_4$ (for the character string "4") for the sub-documents. The first modifier determines a concatenated value of the hash values and generates a digital signature $\sigma_{modifier1}$ for the concatenated hash value. Thereafter, the first modifier generates for each deleted sub-document, auxiliary data including an ID of the modifier, an ID of the deleted sub-document, and the hash value of the deleted sub-document. The first modifier sends the modified electronic document, the digital signature $\sigma_{signer}$ of the singer, the auxiliary data (e.g. (modifier1, 2, $h_2$) and (modifier1, 4, $h_4$) in the example of FIG. 5), and the digital signature $\sigma_{modifier1}$ of the first modifier to a next user.

Upon receiving, from the first modifier, the modified electronic document, the digital signature $\sigma_{singer}$ of the signer, the auxiliary data, and the digital signature $\sigma_{modifier1}$ of the first modifier, a second modifier deletes, for example, the sub-document $m_3$. The second modifier then modifies content of the sub-document $m_3$ to an identifier of the sub-document $m_3$ (e.g., a character string "3" in FIG. 5). Thereafter, the second modifier calculates hash values $h_1$, $H_2$, $H_3$, and $H_4$ (for the character strings "238", "3", and "4") for the sub-documents respectively, determines a concatenated value of the hash values, and generates a digital signature $\sigma_{modifier2}$ for the concatenated hash value. Thereafter, the second modifier generates, for each deleted sub-document, auxiliary data including an ID of the modifier, an ID of the deleted sub-document, and the hash value of the deleted sub-document. The second modifier sends the modified electronic document, the digital signature $\sigma_{signer}$ of the signer, the auxiliary data (e.g., (modifier1, 2, $h_2$), (modifier1, 4, $h_4$) and (modifier2, 3, $h_3$) in the example of FIG. 5), the digital signature $\sigma_{modifier1}$ of the first modifier, and the digital signature $\sigma_{modifier2}$ of the second modifier to a next user.

A verifier receives, from the second and last modifier, the modified electronic document, the digital signature $\sigma_{signer}$ of the signer, the auxiliary data (for example (modifier1, 2, $h_2$), (modifier1, 4, $h_4$), and (modifier2, 3, $h_3$) in FIG. 5), the digital signature $\sigma_{modifier1}$ of the first modifier, and the digital signature $\sigma_{modifier2}$ of the second modifier. The verifier calculates a hash value for each sub-document of the modified electronic document (11) and verifies the second modifier's digital signature $\sigma_{modifier2}$ for a concatenated value of the calculated hash values (12). The verifier further determines the sub-document deleted by the second modifier based on the auxiliary data (e.g., (modifier2, 3, $h_3$)) of the second modifier.

The verifier replaces the hash value $H_3$ calculated in (11)) with the hash value $h_3$ included in the auxiliary data of the second modifier (13). The verifier then verifies the first modifier's digital signature $\sigma_{modifier1}$ for a concatenated value of the hash values $h_1$, $H_2$, $h_3$, and $H_4$ (14). Furthermore, the verifier determines the sub-documents deleted by the first modifier based on the auxiliary data (e.g., (modifier1, 2, $h_2$) and (modifier1, 4, $h_4$)) of the first modifier.

The verifier then replaces the hash values $H_2$ and $H_4$ resulting from the replacement in (13) with the hash values $h_2$ and $h_4$ included in the auxiliary data of the first modifier (15). The verifier verifies the signer's digital signature $\sigma_{signer}$ for a concatenated value of the hash values $h_1$, $h_2$, $h_3$, and $h_4$ (16).

In this way, the number of hash values used by the verifier is reduced. Even so, the third related art handles as many hash values as the deleted sub-documents. Accordingly, when many sub-documents are deleted from an electronic document, auxiliary data volume increases, which unfortunately decreases data transfer efficiency.

SUMMARY

According to an embodiment, a data processing apparatus includes: an input unit configured to accept information on one or more deletion-target data blocks specified from a plurality of data blocks included in content data stored in a data storage unit; a hash generating unit configured to calculate a hash value of each of the plurality of data blocks; an auxiliary data generating unit configured to calculate auxiliary data $\beta = g^{H1} (\mod N)$ of a signer based on predetermined values g and N and a product H1 of the hash values of one or more deletion-target data blocks of the plurality of the data blocks and to store the auxiliary data in an auxiliary data storage unit; a digital signature generating unit configured to calculate intermediate data $\alpha=g^{H2}(\mod N)$ based on the predetermined values g and N and a product H2 of the hash values of one or more remaining data blocks of the plurality of data blocks, except for one or more deletion-target data blocks, to generate a digital signature for a combination of the intermediate data $\alpha$ and position data of one or more deletion-target data blocks with a signing key of a deleter, and to store the digital signature in a digital signature storage unit; and an output unit configured to output to a specified output destination, the auxiliary data stored in the auxiliary data storage unit, the digital signature stored in the digital signature storage unit, the position data of one or more deletion-target data blocks, modified content data including one or more remaining data blocks of the content data stored in the data storage unit, and another digital signature stored in the data storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram for illustrating advantages of an embodiment;

DESCRIPTION OF EMBODIMENTS

Figure 1:
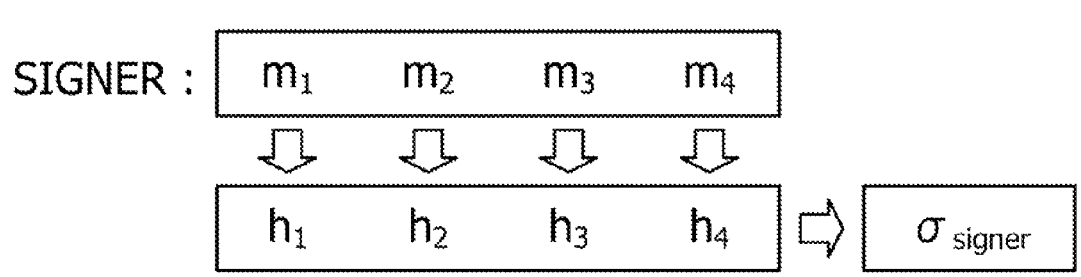
FIG. 1 is a diagram for describing signature processing according to a second related art.
Figure 2:
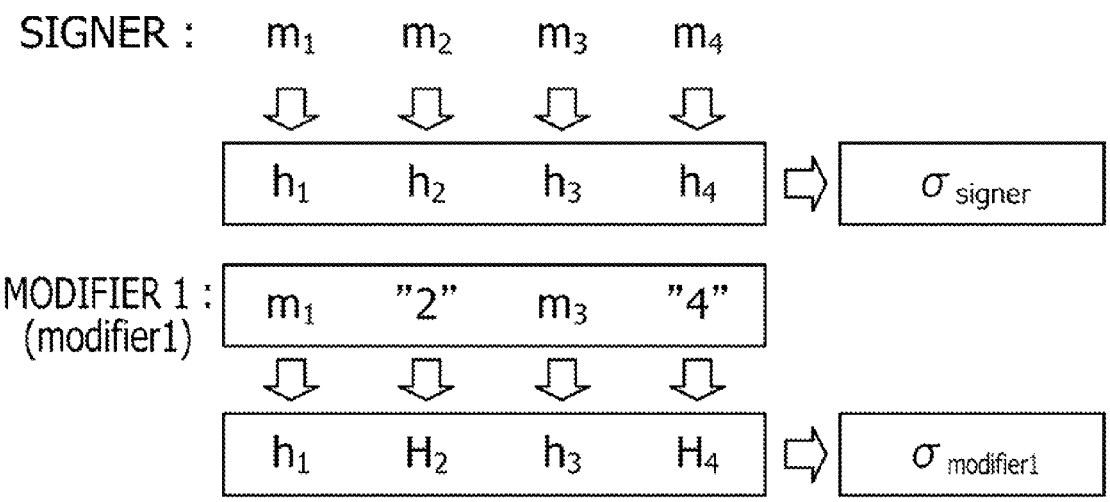
FIG. 2 is a diagram for describing modification processing according to the second related art.
Figure 3:
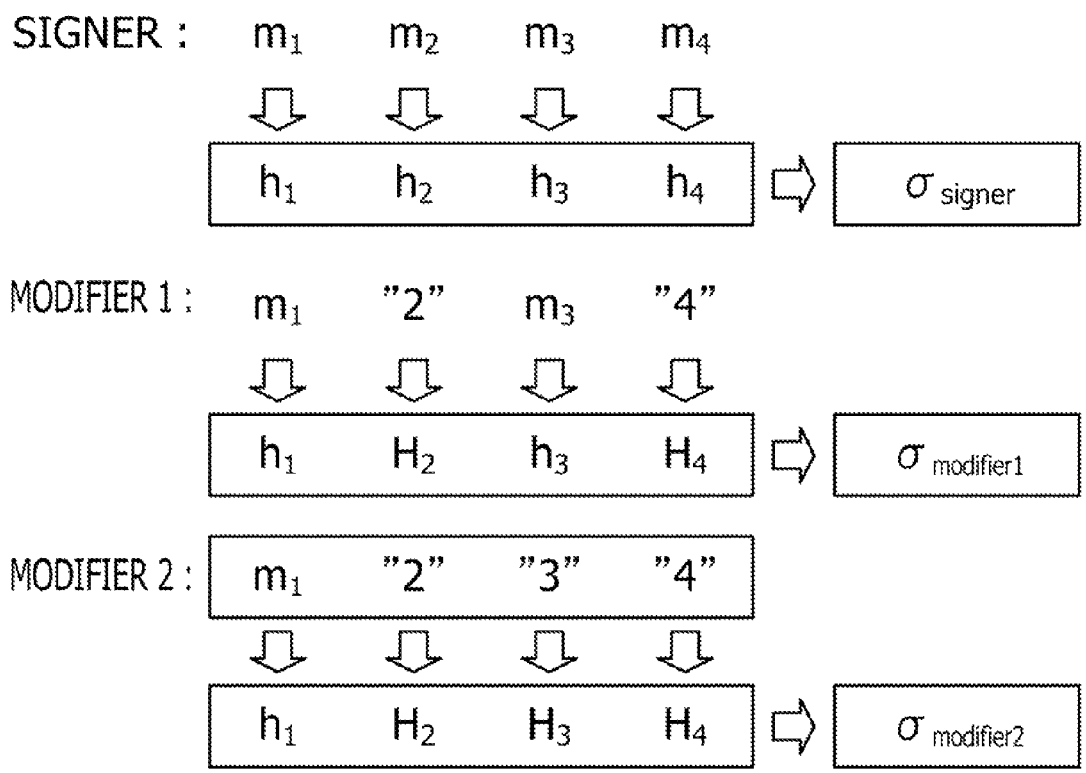
FIG. 3 is a diagram for describing modification processing according to the second related art.
Figure 4:
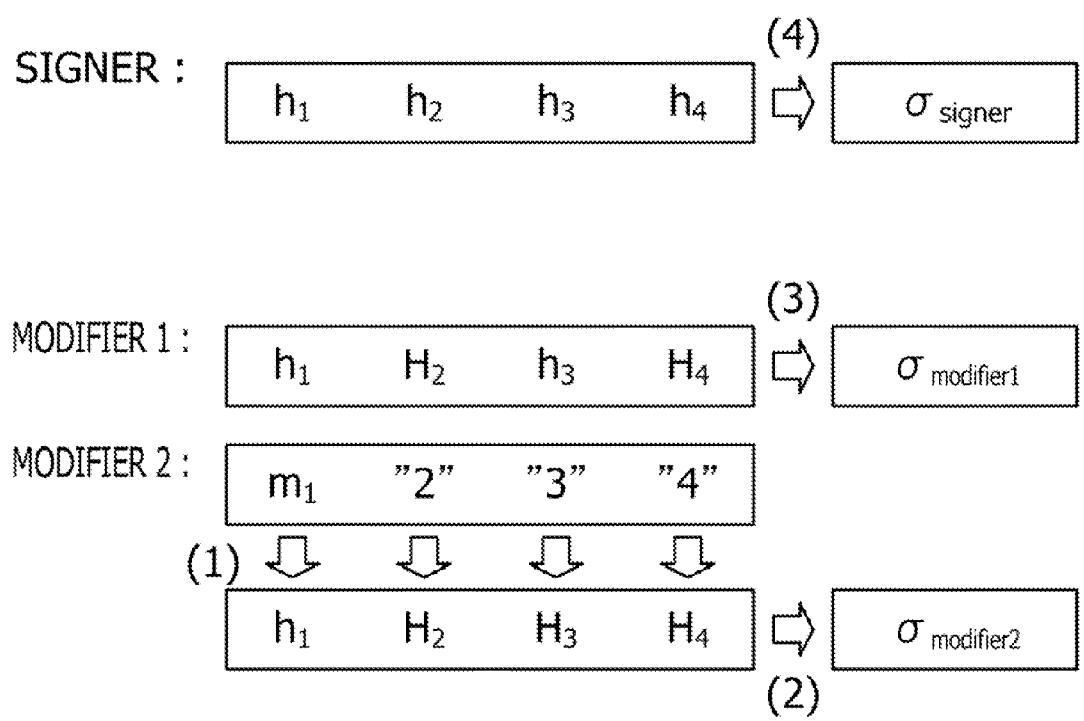
FIG. 4 is a diagram for describing verification processing according to the second related art.
Figure 5:
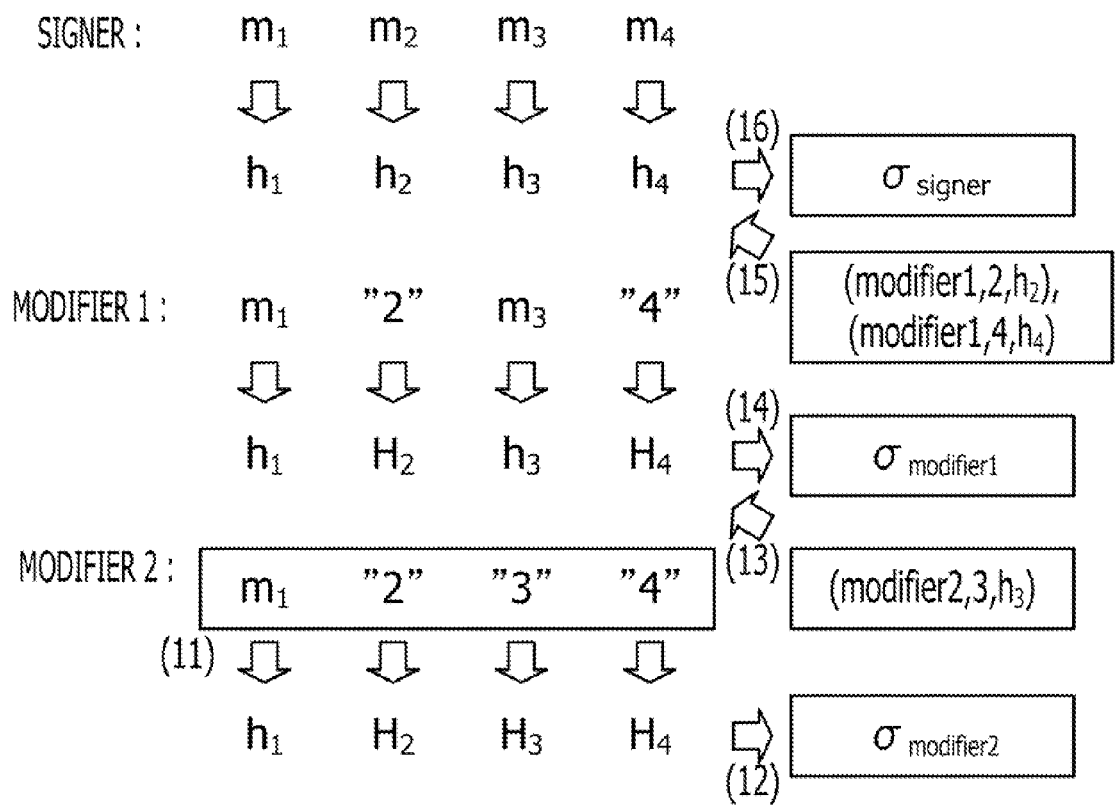
FIG. 5 is a diagram for describing verification processing according to a third related art.
Figure 6:
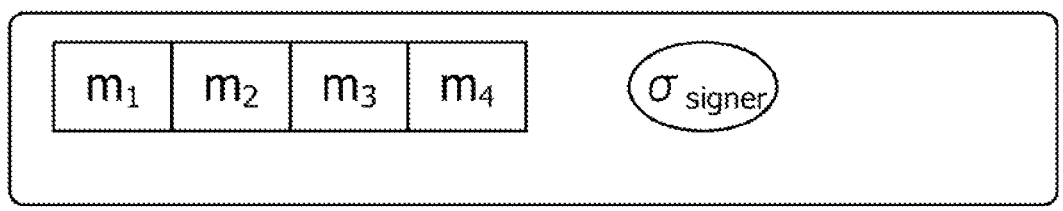
FIG. 6 is a diagram illustrating data sent from a signer terminal according to an embodiment.

An overview of processing according to an embodiment of this technology will be described. An overview of signature generation processing will now be described. A signer divides content data M into a plurality of data blocks $m_1$ to $m_4$. The signer calculates hash values $h_1$ to $h_4$ for the data blocks $m_1$ to $m_4$ respectively. The signer further calculates intermediate data $\alpha_{signer}=g^{h1h2h3h4}(\mod N)$ using a composite number N of prime numbers p and q in a predetermined bit length ($N=p\times q$), an integer g relatively prime to the composite number N, and the hash values $h_1$ to $h_4$, where "h1h2h3h4" represents a product of the hash values $h_1$ to $h_4$. The signer generates a digital signature $\sigma_{signer}=Sign_{signer}(\alpha_{signer})$ of the intermediate data $\alpha_{signer}$ using a signing key of the signer. As illustrated in FIG. 6, the signer sends the content data M including the data blocks $m_1$ to $m_4$ and the digital signature $\sigma_{singer}$ of the signer to a next user.

Figure 7:
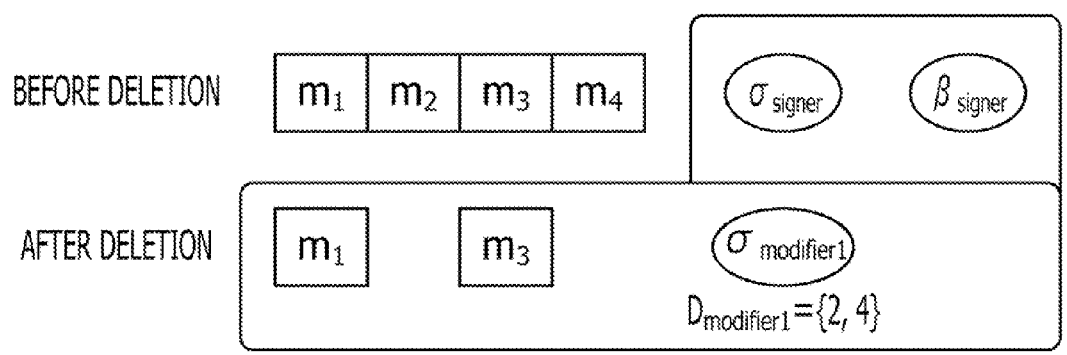
FIG. 7 is a diagram for describing processing in a first modifier terminal according to an embodiment.

A first modifier receives the content data M and the digital signature $\sigma_{signer}$ of the signer and specifies data blocks to be deleted (e.g., the data blocks $m_2$ and $m_4$). After the deletion, the data blocks $m_1$ and $m_3$ remain in the modified content data as illustrated in FIG. 7. The first modifier calculates hash values $h_1$ and $h_3$ for the remaining data blocks $m_1$ and $m_3$, respectively. The first modifier then calculates intermediate data $\alpha_{modifier1}=g^{h1h3}(\mod N)$ of the first modifier using the predetermined values g and N and the hash values $h_1$ and $h_3$. The first modifier further generates a deletion index set $D_{modifier1}=\{2,4\}$ including identifiers of the deleted data blocks (also referred to as position data). The first modifier then combines the intermediate data $\alpha_{modifier1}$ and the index set $D_{modifier1}$ (e.g., a concatenation) and generates a digital signature $\sigma_{modifier1}=Sign_{modifier1}(\alpha_{modifier1}\|D_{modifier1})$ using a signing key of the first modifier. The first modifier further calculates auxiliary data $\beta_{singer}=g^{h2h4}(\mod N)$ of the signer using a product $h_2 \cdot h_4$ of the hash values of the deleted data blocks $m_2$ and $m_4$ and the predetermined values g and N. The auxiliary data of the signer is used to verify the digital signature $\sigma_{signer}$ of the signer later on.

After performing the foregoing calculation, the first modifier sends to a next user the modified content data, the digital signature $\sigma_{modifier1}$ of the first modifier, the deletion index set $D_{modifier1}$, the digital signature $\sigma_{signer}$ of the signer, and the auxiliary data $\beta_{singer}$ of the signer. More specifically, data enclosed by rectangular lines in FIG. 7 is sent to the next user.

Figure 8:
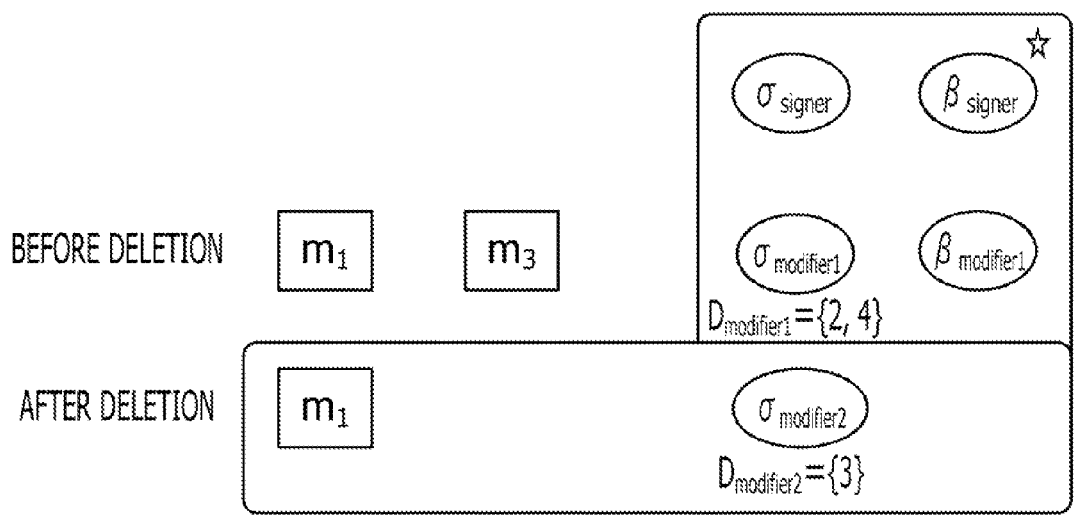
FIG. 8 is a diagram for describing processing in a second modifier terminal according to an embodiment.

Upon receiving from the first modifier the modified content data, the digital signature $\sigma_{modifier1}$ of the first modifier, the deletion index set $D_{modifier1}$, the digital signature $\sigma_{singer}$ of the signer, and the auxiliary data $\beta_{signer}$ of the signer, a second modifier specifies a data block to be deleted (e.g., the data block $m_3$) of the modified content data. After the deletion, the data block $m_1$ remains in the modified content data as illustrated in FIG. 8. The second modifier calculates a hash value $h_1$ of the remaining data block $m_1$. The second modifier then calculates intermediate data $\alpha_{modifier2}=g^{h1}(\mod N)$ of the second modifier using the predetermined values g and N and the hash value $h_1$. The second modifier further generates a deletion index set $D_{modifier2}=\{3\}$ including an identifier (or position data) of the deleted data block. The second modifier combines the intermediate data $\alpha_{modifier2}$ and the index set $D_{modifier2}$ (e.g. a concatenation) and generates a digital signature $\sigma_{modifier2}=Sign_{modifier2}(\alpha_{modifier2}\|D_{modifier2})$ using a signing key of the second modifier. The second modifier further calculates auxiliary data $\beta_{modifier1}=g^{h3} \pmod N$ of the first modifier using the hash value $h_3$ of the deleted data block $m_3$ and the predetermined values g and N. The auxiliary data of the first modifier is used to verify the digital signature $\sigma_{modifier1}$ of the first modifier later on.

Furthermore, as indicated by a star in FIG. 8, the second modifier updates the auxiliary data $\beta_{signer}$ of the signer for use in verification of the signer's digital signature $\sigma_{signer}$ later on to $\beta_{signer}{}^{h3}=g^{h2h3h4} \pmod N$.

After performing the foregoing calculation, the second modifier sends to a next user the modified content data, the digital signature $\sigma_{modifier1}$ of the first modifier, the digital signature the second modifier, $\sigma_{modifier2}$ of deletion index sets $D_{modifier1}$ and $D_{modifier2}$, the digital signature $\sigma_{signer}$ of the signer, the auxiliary data $\beta_{signer}$ of the signer, and the auxiliary data $\beta_{modifier1}$ of the first modifier. More specifically, data enclosed by rectangular lines in FIG. 8 is sent to the next user.

In this example, no confidential data block can be deleted from the modified content data anymore. However, when the modified content data further includes for example, a data block $m_5$, a third modifier specifies the data block $m_5$ as a deletion-target data block. After the deletion, the data block $m_1$ remains in the modified content data. The third modifier calculates a hash value $h_1$ of the remaining data block $m_1$. The third modifier then calculates intermediate data $\alpha_{modifier3}=g^{h1}$ (mod N) of the third modifier using the predetermined values g and N and the hash value $h_1$. The third modifier further generates a deletion index set $D_{modifier3}=\{5\}$ including an identifier (or position data) of the deleted data block. The third modifier combines the intermediate data $\alpha_{modifier3}$ and the index set $D_{modifier3}$ (e.g. a concatenation) and generates a digital signature $\sigma_{modifier3}=\text{Sign}_{modifier3}(\alpha_{modifier3}\|D_{modifier3})$ using a signing key of the third modifier. The third modifier further calculates auxiliary data $\beta_{modifier2}=g^{h5} \pmod N$ of the second modifier using the hash value $h_5$ of the deleted data block $m_5$ and the predetermined values g and N. The auxiliary data of the second modifier is used to verify the digital signature $\sigma_{modifier2}$ of the second modifier later on.

Furthermore, the third modifier updates the signer's auxiliary data $\beta_{signer}$ for use later on in verification of the signer's digital signature $\sigma_{signer}$ to new auxiliary data $\beta_{signer}{}^{h5}=g^{h2h3h4h5} \pmod N$. Similarly, the third modifier updates the first modifier's auxiliary data $\beta_{modifier1}$ for use in verification of the first modifier's digital signature $\sigma_{modifier1}$ to new auxiliary data $\beta_{modifier1}{}^{h5}=g^{h3h5} \pmod N$.

After performing the foregoing calculation, the third modifier sends to a next user the modified content data, the digital signature $\sigma_{modifier1}$ of the first modifier, the digital signature $\sigma_{modifier2}$ of the second modifier, the digital signature $\sigma_{modifier3}$ of the third modifier, the deletion index sets $D_{modifier1}$, $D_{modifier2}$, and $D_{modifier3}$, the digital signature $\sigma_{signer}$ of the signer, the auxiliary data $\beta_{signer}$ of the signer, the auxiliary data $\beta_{modifier1}$ of the first modifier, and the auxiliary data $\beta_{modifier2}$ of the second modifier.

Figure 9:
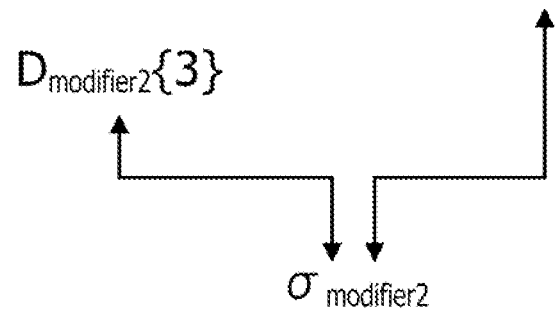
FIG. 9 is a diagram for describing processing in a verifier terminal according to an embodiment.

Processing for verifying data received from the second modifier will now be described using FIG. 9. In operation (1), a hash value $h_1$ is calculated from the data block $m_1$ included in the modified content data. Intermediate data $\alpha_{modifier2}=g^{h1}$ (mod N) of the second modifier is further calculated from the predetermined values g and N and the hash value $h_1$. If a verification of the digital signature $\sigma_{modifier2}$ of the second modifier succeeds with a verification key of the second modifier on the calculated intermediate data $\alpha_{modifier2}$ and the deletion index set $D_{modifier2}$ of the second modifier, the integrity of the content data modified by the second modifier and the deletion index set generated by the second modifier is successfully verified.

After the success of the verification of the content data modified by the second modifier, intermediate data of the first modifier is calculated using the predetermined value N and the auxiliary data $\beta_{modifier1}$ of the first modifier in operation (2). More specifically, the intermediate data $\alpha_{modifier1}=\beta_{modifier1}{}^{h1} \pmod N$ of the first modifier is calculated. Since the auxiliary data of the first modifier is represented as $\beta_{modifier1}=g^{h3} \pmod N$, the intermediate data $\alpha_{modifier1}=\beta/\text{modifier1}^{h1} \pmod N = g^{h1h3} \pmod N$ will be determined. If a verification of the digital signature $\sigma_{modifier1}$ of the first modifier succeeds with a verification key of the first modifier on the calculated intermediate data $\alpha_{modifier1}$ and the deletion index set $D_{modifier1}$ of the first modifier, the integrity of the content data modified by the first modifier and the deletion set generated by the first modifier is successfully verified.

After the success of the verification of the content modified by the first modifier, intermediate data of the signer is calculated using the predetermined value N, the auxiliary data $\beta_{signer}$ of the signer, and the calculated hash value $h_1$ in operation (3). More specifically, the intermediate data $\alpha_{signer}=\beta_{signer}{}^{h1} \pmod N$ of the first modifier is calculated. Since the auxiliary data of the signer is represented as $\beta_{signer}=g^{h2h3h4} \pmod N$, the intermediate data $\alpha_{signer}=\beta_{signer}{}^{h1} \pmod N = g^{h1h2h3h4} \pmod N$ will be determined. If a verification of the digital signature $\sigma_{signer}$ of the signer with a verification key of the signer, the integrity of the original content data originally sent from the signer is successfully verified.

In this way, the modified content data can be verified. The deleted data block is identified based on the deletion index set of the specific user. That is, it is possible to verify who has deleted which data block, and thus the integrity of the content data in each step.

Discussion will be given with reference to FIG. 10 for a volume of data to be sent to the next user in the foregoing example in which the first and second modifier delete three out of four data blocks of the content data. As described in the "BACKGROUND" section, content data still includes four data blocks after deletion of some of data blocks since the deleted data blocks are replaced by identifiers thereof in the second and third related arts. In this embodiment, however, one data block, i.e., the data block $m_1$, remains in the content data after deletion as described above. Additionally, as many digital signatures as the number of the signer, the first modifier, and the second modifier, i.e., three (=the number of modifiers+1) digital signatures, are needed in this embodiment just like the second and third related arts.

The second related art needs the hash values used or calculated by the signer and the modifiers, i.e., 4×3=12 hash values. The third related art needs as many hash values as the number of deleted data blocks, i.e., three hash values. This embodiment, however, does not need the hash values. In this embodiment, as many pieces of auxiliary data as the number of modifiers are generated. That is, two auxiliary data values are generated.

Even if one modifier deletes many data blocks, the size of the auxiliary data does not change. Thus, for example, if many frames are deleted from video data, the volume of data for use in verification does not increase.

A system and processing content according to the embodiment will be described below based on such an overview of this embodiment.

Figure 11:
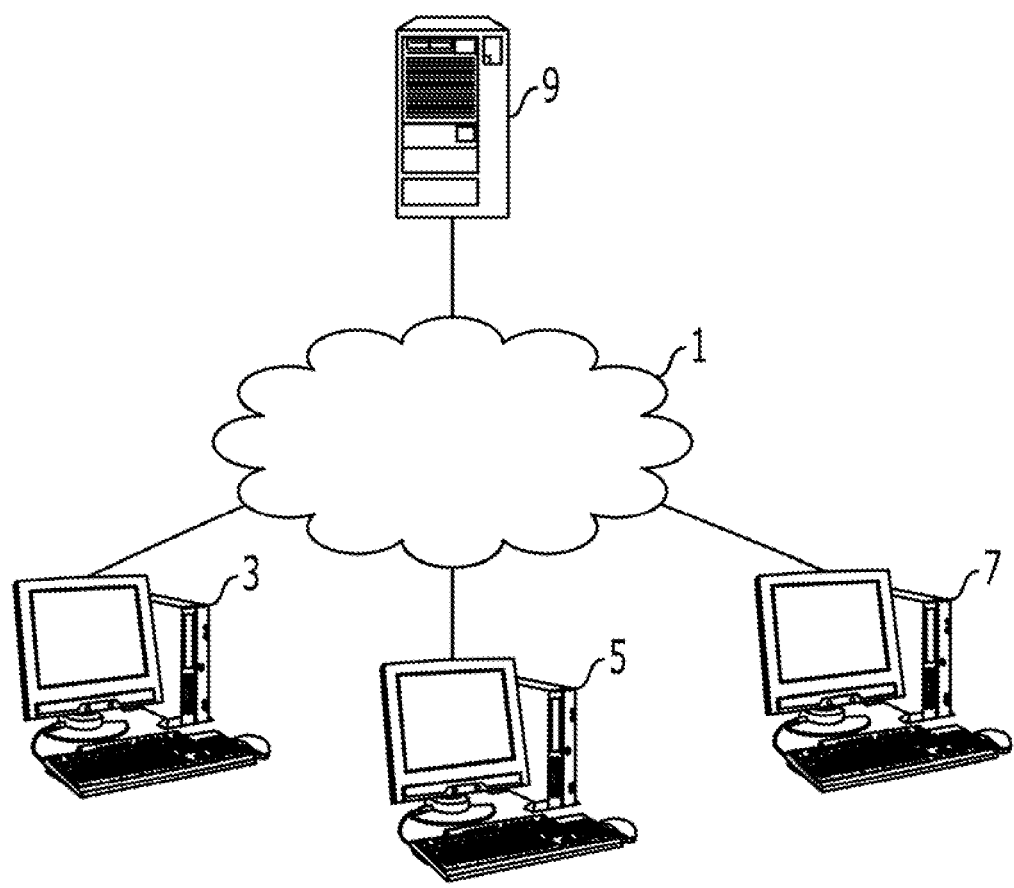
FIG. 11 is a diagram illustrating an overview of a system according to an embodiment.

FIG. 11 illustrates an overview of a data management system. For example, a certification authority server 9 for issuing a signing key for a specific user and providing a verification key for the signing key, one or more signer terminals 3, one or more modifier terminals 5, and one or more verifier terminals 7 are connected to a network 1, such as the Internet or a local area network (LAN). For example, personal computers function as the signer terminal 3, the modifier terminal 5, and the verifier terminal 7 and execute programs having functions to be described below. Although the signer terminal 3, the modifier terminal 5, and the verifier terminal 7 are treated as different terminals for convenience, every terminal has the functions of the signer terminal 3, the modifier terminal 5, and the verifier terminal 7. That is, the signer may act as the modifier or the verifier, whereas the modifier and the verifier may act as the signer or the verifier and the signer or the modifier, respectively.

Figure 12:
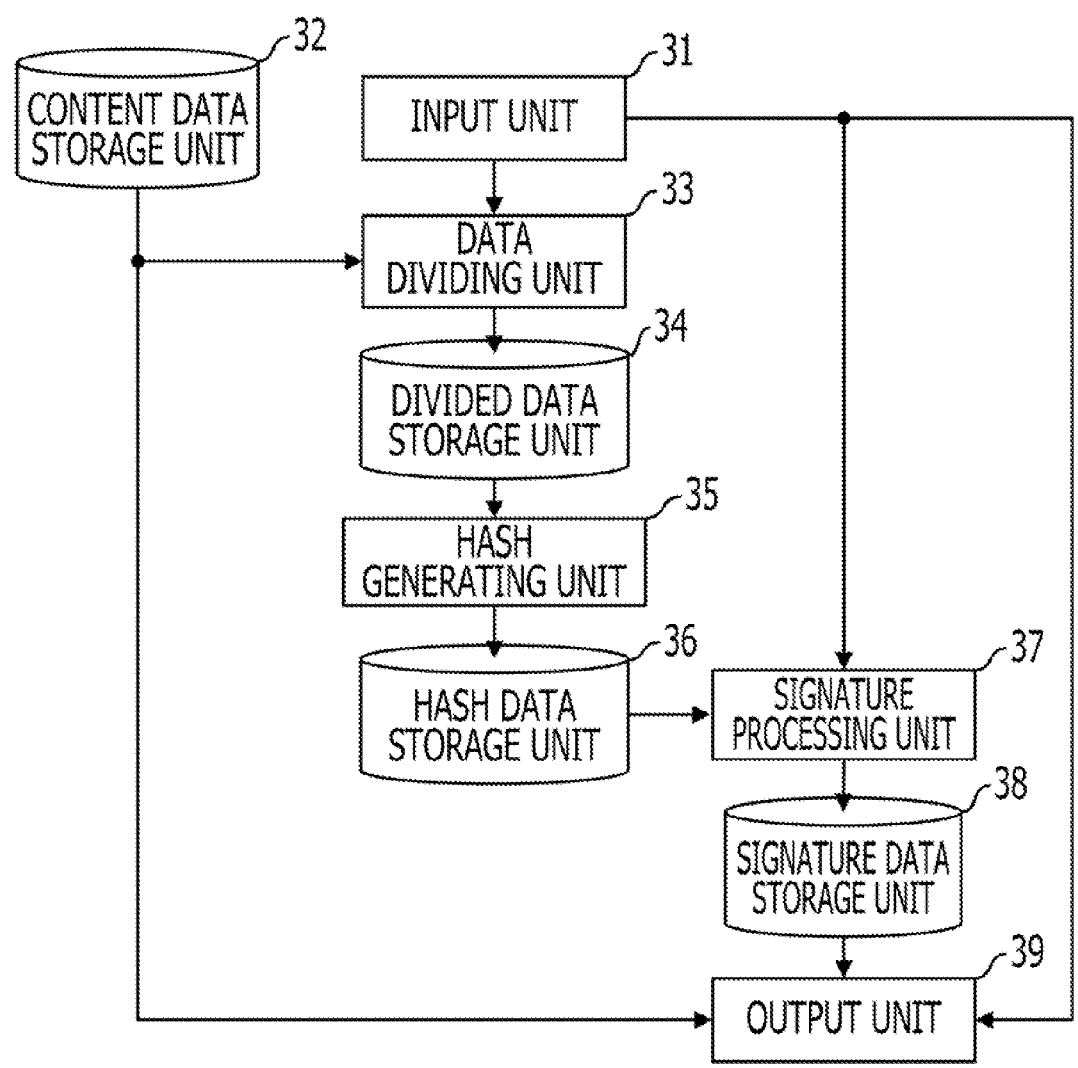
FIG. 12 is a functional block diagram of a signer terminal.

FIG. 12 illustrates a functional block diagram of the signer terminal 3. The signer terminal 3 includes an input unit 31, a content data storage unit 32, a data dividing unit 33, a divided data storage unit 34, a hash generating unit 35, a hash data storage unit 36, a signature processing unit 37, a signature data storage unit 38, and an output unit 39. The input unit 31 accepts instructions and inputs from a signer. The content data storage unit 32 stores content data to be attached with a signature. The data dividing unit 33 divides specific content data stored in the content data storage unit 32 into a plurality of data blocks in accordance with an instruction supplied from the input unit 31. The divided data storage unit 34 stores data of each data block resulting from the processing by the data dividing unit 33. The hash generating unit 35 calculates a hash value of each data block stored in the divided data storage unit 34. The hash data storage unit 36 stores the hash values calculated by the hash generating unit 35. The signature processing unit 37 generates a digital signature using input data supplied from the input unit 31 and the hash values stored in the hash data storage unit 36. The signature data storage unit 38 stores the digital signature generated by the signature processing unit 37. The output unit 39 outputs to a specified apparatus the specific content data stored in the content data storage unit 32, and the digital signature stored in the signature data storage unit 38 in accordance with an instruction supplied form the input unit 31.

Figure 13:
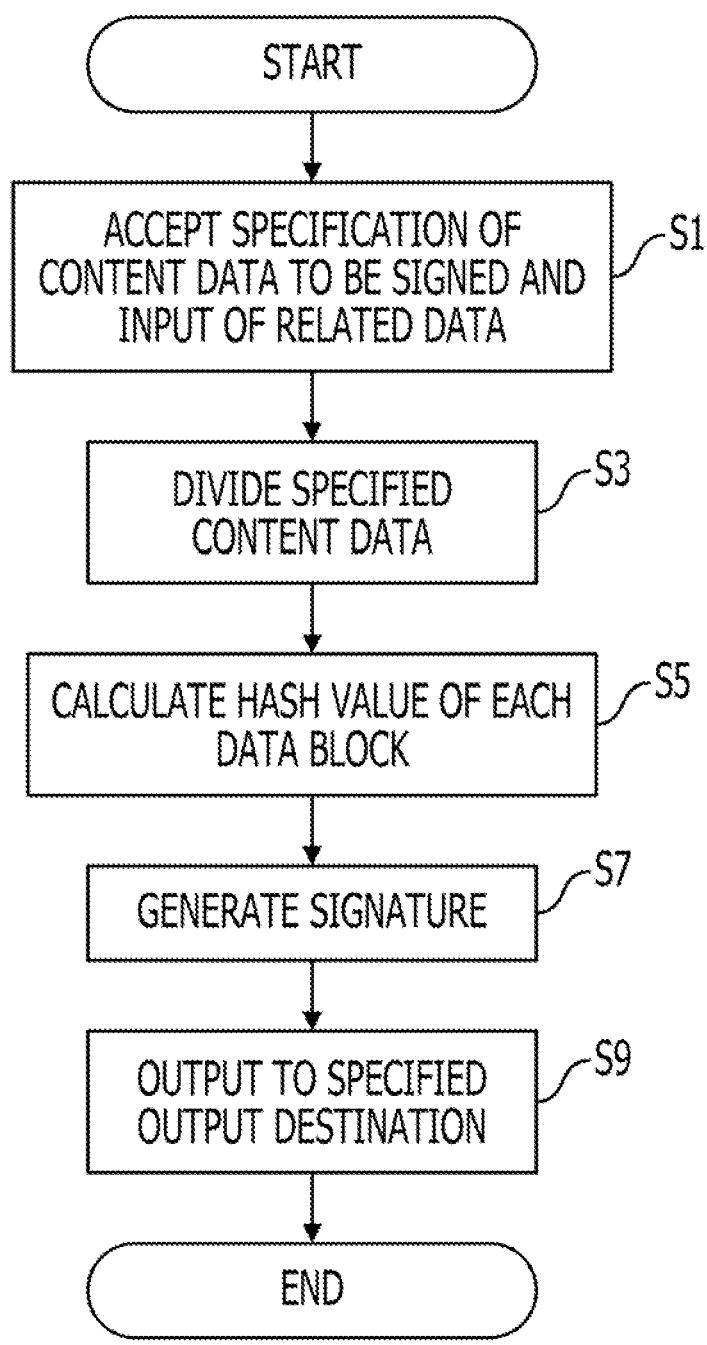
FIG. 13 is a flowchart illustrating processing in the signer terminal.

An operation of the signer terminal 3 will be described using FIG. 13. The input unit 31 accepts from a signer data specifying content data to be attached with a signature and an output destination (STEP S1). The data may include data of a signing key of the signer or a data storage area storing the signing key of the signer. The input unit 31 instructs the data dividing unit 33 to process the specified content data.

In accordance with the instruction from the input unit 31, the data dividing unit 33 divides the specified content data into a plurality of data blocks and stores the resulting data blocks in the divided data storage unit 34 (STEP S3). The content data does not have to be divided equally and may be divided in accordance with a predetermined rule of the system. When content data including divided data blocks is used, the divided data blocks may be stored in the divided data storage unit 34 without the processing in STEP S3. The hash generating unit 35 calculates a hash value of each data block stored in the divided data storage unit 34 and stores the calculated hash value in the hash data storage unit 36 (STEP S5).

The signature processing unit 37 calculates a product of the hash values $h_i$ of the data blocks stored in the hash data storage unit 36, and then intermediate data $\alpha_{signer} = g^{\pi h_i} (\mod N)$ based on predetermined values g and N and the product of the hash values $h_i$. The signature processing unit 37 generates a digital signature $\sigma_{signer}$ and stores the generated digital signature $\sigma_{signer}$ in the signature data storage unit 38 (STEP S7). The predetermined values g and N may be stored in a data storage area managed by the signature processing unit 37 or input through the input unit 31, for example.

The output unit 39 then outputs, to the specified output destination, the specific content data stored in the content data storage unit 32 and the signer's digital signature $\sigma_{singer}$ stored in the signature data storage unit 38 (STEP S9). For example, the output unit 39 sends the content data and the digital signature to the modifier terminal 5 of a first modifier.

The foregoing processing yields data schematically illustrated in FIG. 6.

Figure 14:
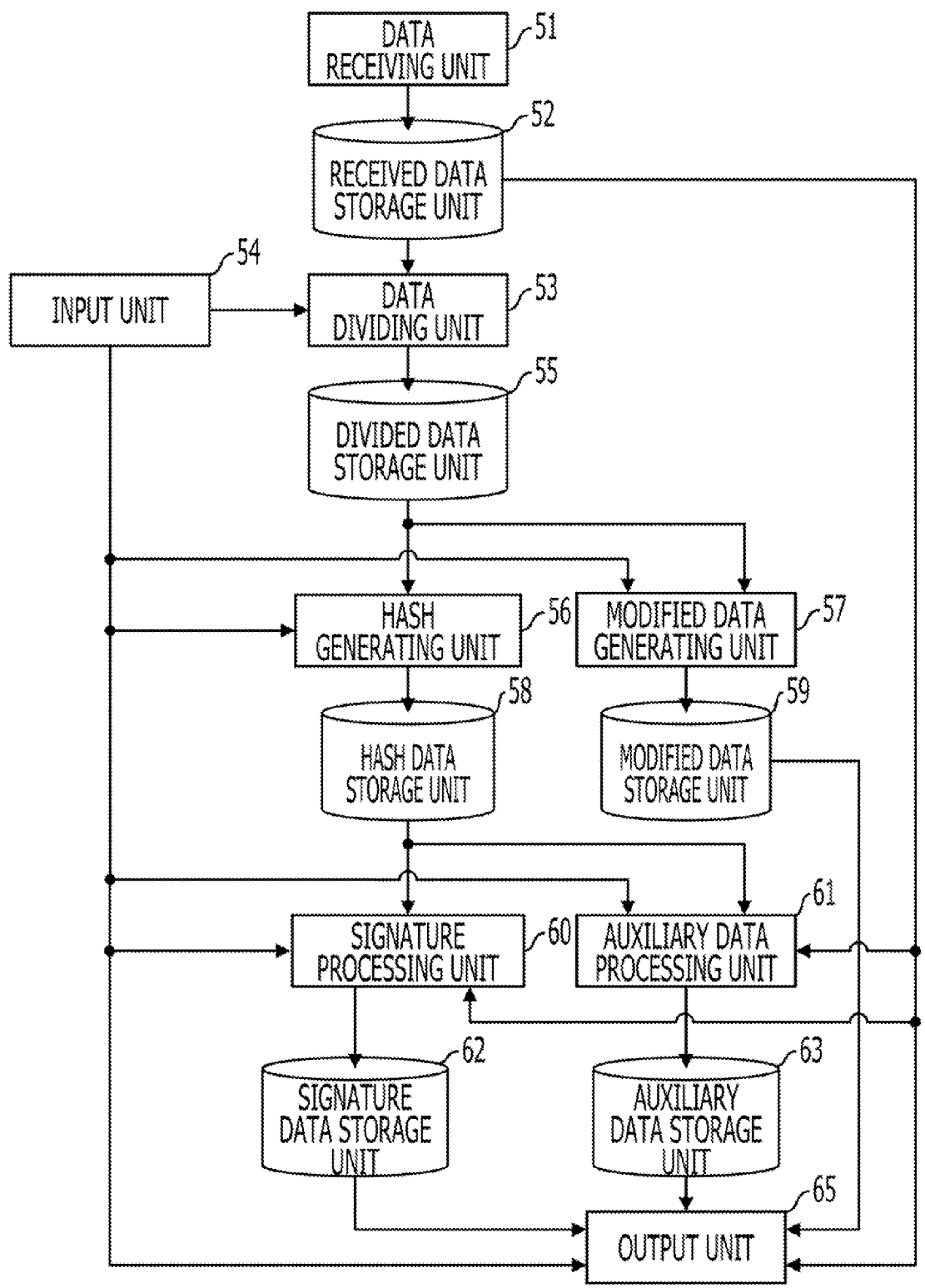
FIG. 14 is a functional block diagram of a modifier terminal.

FIG. 14 illustrates a functional block diagram of the modifier terminal 5. The modifier terminal 5 includes an input unit 54, a data receiving unit 51, a received data storage unit 52, a data dividing unit 53, a divided data storage unit 55, a hash generating unit 56, a modified data generating unit 57, a hash data storage unit 58, a modified data storage unit 59, a signature processing unit 60, an auxiliary data processing unit 61, a signature data storage unit 62, an auxiliary data storage unit 63, and an output unit 65. The input unit 54 accepts, from a modifier, instructions and input data. The data receiving unit 51 receives, from another terminal, content data to be modified and related data thereof. The received data storage unit 52 stores the data received by the data receiving unit 51. The data dividing unit 53 divides the content data stored in the received data storage unit 52 into a plurality of data blocks. The divided data storage unit 55 stores the data blocks generated by the data dividing unit 53. The modified data generating unit 57 generates modified content data in response to deletion of a data block specified by the modifier. The modified data storage unit 59 stores the modified content data. The hash generating unit 56 calculates a hash value of each data block stored in the divided data storage unit 55. The hash data storage unit 58 stores the hash values calculated by the hash generating unit 56. The signature processing unit 60 generates a digital signature of the modifier using the data stored in the received data storage unit 52 and the hash values stored in the hash data storage unit 58. The signature data storage unit 62 stores the data generated by the signature processing unit 60. The auxiliary data processing unit 61 processes auxiliary data of the previous user of the modifier regarding the content data using the hash value stored in the hash data storage unit 58. The auxiliary data storage unit 63 stores a result of the processing by the auxiliary data processing unit 61. The output unit 65 outputs to a specified output destination the data stored in the signature data storage unit 62, the auxiliary data storage unit 63, the modified data storage unit 59, and the received data storage unit 52 in accordance with the instruction of the input unit 54.

The input unit 54 supplies the data dividing unit 53, the modified data generating unit 57, the hash generating unit 56, the signature processing unit 60, the auxiliary data processing unit 61, and the output unit 65 with instructions and data.

Figure 15:
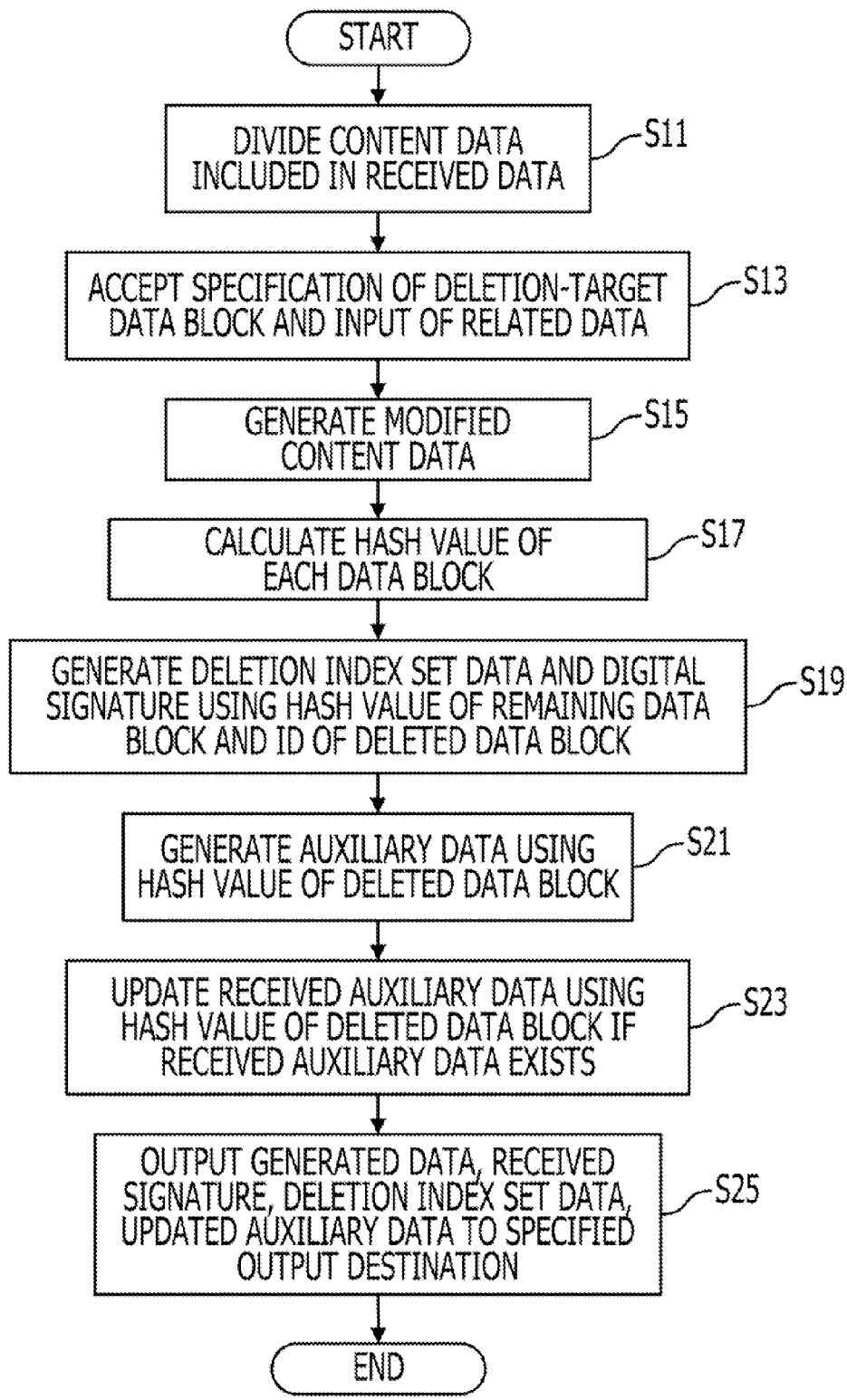
FIG. 15 is a flowchart illustrating processing in the modifier terminal.

The content of processing by the modifier terminal 5 will now be described using FIG. 15. Upon receiving data from the signer terminal 3 or another modifier terminal 5, the data receiving unit 51 stores the received data in the received data storage unit 52. As illustrated in FIGS. 6 and 7, the data received from the signer terminal 3 differs from that received from the other modifier terminal 5.

The modifier specifies content data to be modified through the input unit 54. The input unit 54 outputs information on the specified content data to the data dividing unit 53. The data dividing unit 53 divides the content data stored in the received data storage unit 52 into a plurality of data blocks (STEP S11). As described above, the content data is divided in accordance with the predetermined rule of the system so that similar data blocks are generated in each terminal. The plurality of generated data blocks may be presented to the modifier so that the modifier can specify one or more data blocks to be deleted.

The modifier then performs an input operation on the input unit 54 to specify a data block to be deleted (hereinafter, referred to as a deletion-target data block) and related data (e.g., an output destination and a signing key). The input unit 54 accepts and stores information on the deletion-target data block and the input related data in a storage device, such as a main memory (STEP S13). The related data may include data of the signer's signing key or specification of a predetermined data storage area storing the signer's signing key.

The input unit 54 outputs to the modified data generating unit 57 an identifier of the deletion-target data block. For example, since the identifier is assigned in series from the first data block of the content data, the identifier can be referred to as data representing a position in the content data. The modified data generating unit 57 generates modified content data by using remaining data blocks, other than the deletion-target data block, stored in the divided data storage unit 55 (STEP S15). The modified data generating unit 57 then stores the modified content data in the modified data storage unit 59.

The hash generating unit 56 calculates a hash value of each data block stored in the divided data storage unit 55 in accordance with an instruction from the input unit 54 and stores the resulting hash values in the hash data storage unit 58 (STEP S17). As described above, the usage of the hash value of the deletion-target data block differs from that of the hash values of the remaining data blocks though the calculated hash values for all data blocks are used.

The signature processing unit 60 receives the identifier of the deletion-target data block from the input unit 54 and generates deletion index set data D of the modifier including the identifier of the deletion-target data block. The signature processing unit 60 also reads out the hash values of the remaining data blocks except for that of the deletion-target data block from the hash data storage unit 58 to calculate a product of the hash values $h_i$ and intermediate data $\alpha_{modifier} = g^{\pi h j}(\text{mod } N)$. The signature processing unit 60 then combines the intermediate data $\alpha_{modifier}$ and the deletion index set data D and generate a digital signature $\sigma_{modifier}$ of the modifier with the modifier's signing key. The signature processing unit 60 stores the deletion index set data D and the modifier's digital signature $\sigma_{modifier}$ in the signature data storage unit 62 (STEP S19). For example, the predetermined values g and N may be stored in a data storage area managed by the signature processing unit 60, or input through the input unit 54.

The identifier of the deletion-target data block included in the deletion index set data D uniquely identifies a data block in any terminal. Accordingly, when the received data storage unit 52 stores deletion index set data D of another modifier, the identifier is assigned in consideration of the identifier included in the other modifier's deletion index set data D instead of simply assigning the identifier in series to the data blocks stored in the divided data stored unit 55. For example, when content data originally includes five data blocks and the received deletion index set data D is represented as {2, 4}, the data blocks existing in this terminal are not {1, 2, 3} but {1, 3, 5}. On the basis of such recognition, the signature processing unit 60 sets the identifier in the deletion index set data D.

The auxiliary data processing unit 61 receives the identifier of the deletion-target data block from the input unit 54. The auxiliary data processing unit 61 reads out the hash value corresponding to the deletion-target data block from the hash data storage unit 58 to calculate a product of the hash value $h_k$ and auxiliary data $\beta_{previous\_user} = g^{\pi h k}(\text{mod } N)$ of the previous modifier or the signer. The auxiliary data processing unit 61 then stores the resulting auxiliary data in the auxiliary data storage unit 63 (STEP S21). When the received data storage unit 52 stores auxiliary data of another user, the auxiliary data processing unit 61 reads the other user's auxiliary data $\beta_{received}$ and replaces the auxiliary data $\beta_{received}$ by data $\beta_{received}^{\pi h k}(\text{mod } N)$ using the product of the hash values $h_k$ of the deletion-target data blocks. The auxiliary data processing unit 61 stores the resulting auxiliary data $\beta_{received}$ in the auxiliary data storage unit 63 (STEP S23).

The output unit 65 sends to the output destination specified by the input unit 54 the digital signature and the deletion index set data of the modifier stored in the signature data storage unit 62, the auxiliary data of the signer or the previous modifier stored in the auxiliary data storage unit 63, the digital signatures and the deletion index set data stored in the received data storage unit 52, and the auxiliary data stored in the auxiliary data storage unit 63 (STEP S25).

Data illustrated in FIG. 7 or 8 is output to a next user through execution of the foregoing processing.

Figure 16:
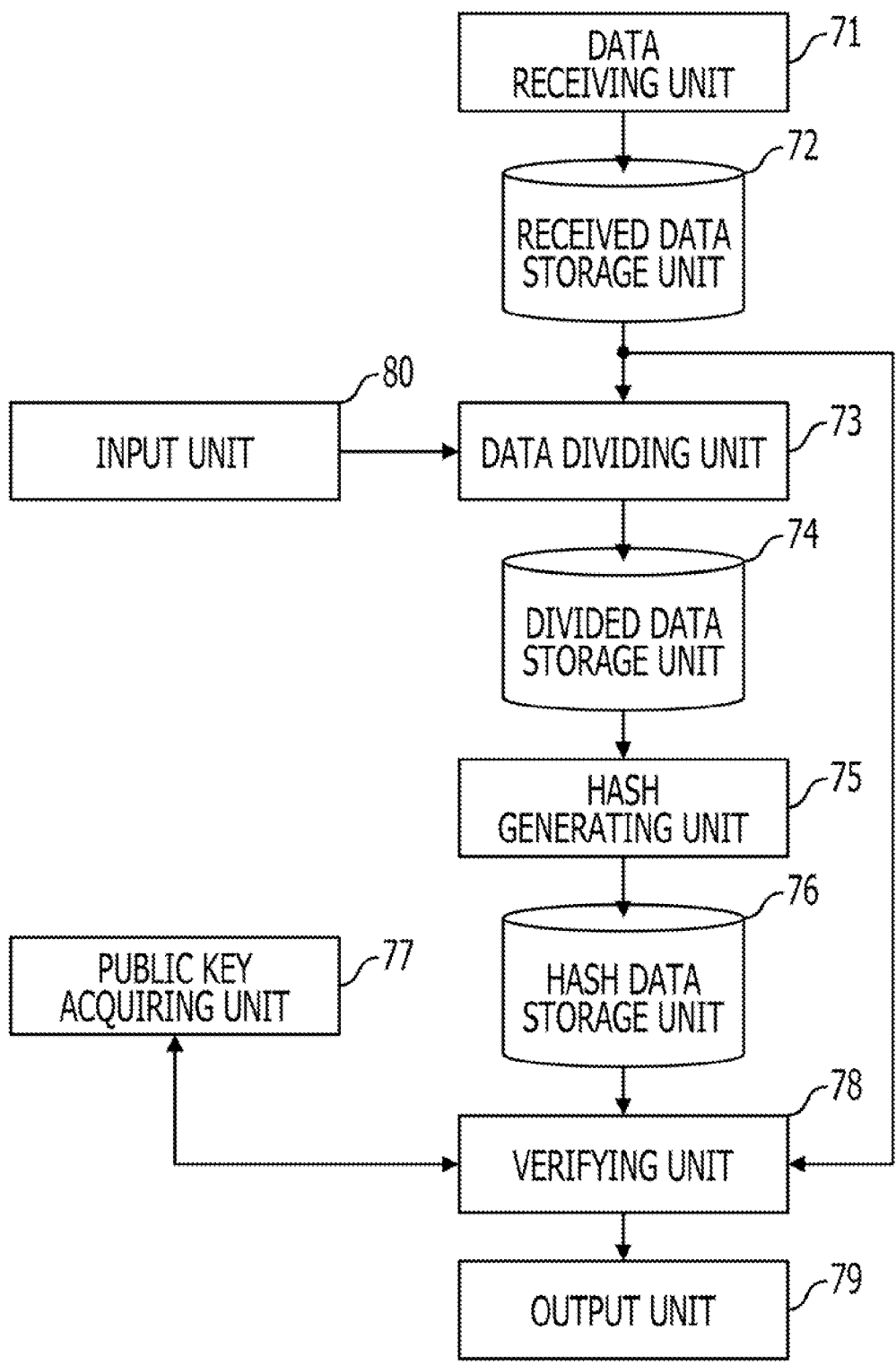
FIG. 16 is a functional block diagram of a verifier terminal.

FIG. 16 illustrates a functional block diagram of the verifier terminal 7. The verifier terminal 7 includes a data receiving unit 71, a received data storage unit 72, a data dividing unit 73, a divided data storage unit 74, a hash generating unit 75, a hash data storage unit 76, a verification key acquiring unit 77, a verifying unit 78, an output unit 79, and an input unit 80. The data receiving unit 71 receives data from the signer terminal 3 or the modifier terminal 5. The received data storage unit 72 stores the data received by the data receiving unit 71. The input unit 80 accepts instructions from a verifier. The data dividing unit 73 divides content data stored in the received data storage unit 72 into data blocks in accordance with an instruction supplied from the input unit 80. The divided data storage unit 74 stores data of the data blocks generated by the data dividing unit 73. The hash generating unit 75 calculates a hash value of each data block stored in the divided data storage unit 74. The hash data storage unit 76 stores the hash values calculated by the hash generating unit 75. The verification key acquiring unit 77 acquires a user's verification key from, for example, the certification authority server 9. The verifying unit 78 executes verification processing using the data stored in the hash data storage unit 76, the data stored in the received data storage unit 72, and the verification key received from the verification key acquiring unit 77. The output unit 79 outputs a result of the verification executed by the verifying unit 78.

Figure 17:
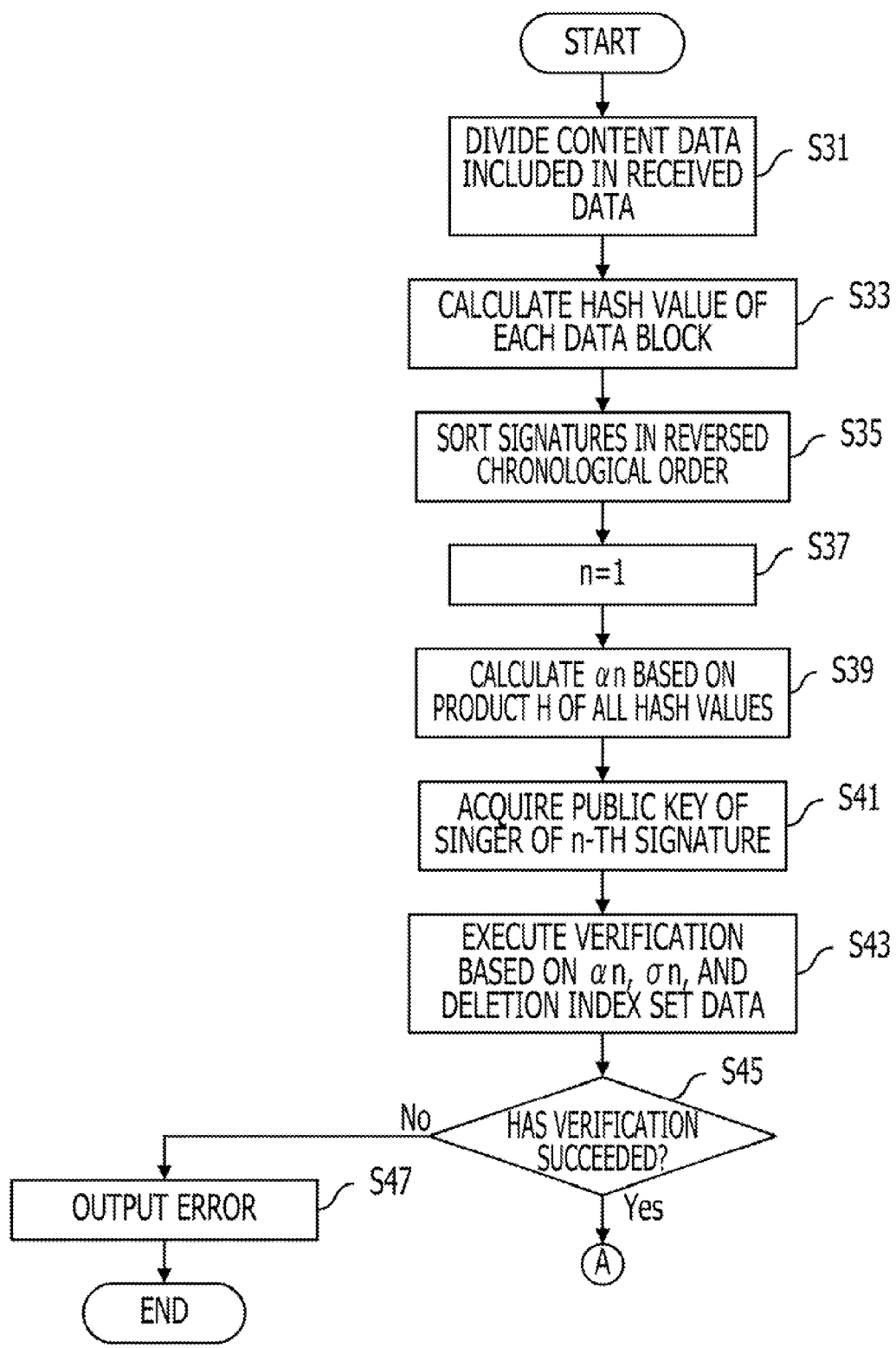
FIG. 17 is a flowchart illustrating processing in the verifier terminal.

An operation of the verifier terminal 7 will now be described with reference to FIGS. 17 and 18. Upon receiving data from another terminal, the data receiving unit 71 stores the received data in the received data storage unit 72. Upon accepting an instruction for starting verification from a verifier, the input unit 80 instructs the data dividing unit 73 to start the processing. When the received data storage unit 72 stores a plurality of pieces of content data, the verifier specifies one of the plurality of pieces of content data to be processed.

Upon receiving the instruction from the input unit 80, the data dividing unit 73 divides the content data stored in the received data storage unit 72 into data blocks and stores the resulting data blocks in the divided data storage unit 74 (STEP S31). The hash generating unit 75 calculates a hash value of each data block stored in the divided data storage unit 74 and stores the calculated hash values in the hash data storage unit 76 (STEP S33).

Thereafter, the verifying unit 78 reads the digital signatures and related data thereof (more specifically, the deletion index set data and the auxiliary data) stored in the received data storage unit 72. The verifying unit 78 sorts the digital signatures and the related data thereof in a reversed chronological order based on generation time included in the corresponding digital signatures (STEP S35). The verifying unit 78 then initializes a counter "n" to 1 (STEP S37). The verifying unit 78 calculates n-th intermediate data $\alpha_n = g^H \pmod{N}$ from a product H of the hash values stored in the hash data storage unit 76 and stores the n-th intermediate data in a storage device, such as a main memory (STEP S39). The predetermined values g and N may be stored in a data storage area managed by the signature processing unit 37 or input through the input unit 31, for example.

The verifying unit 78 also causes the verification key acquiring unit 77 to acquire a verification key of a signer of an n-th digital signature $\sigma_n$ (i.e., a user having generated the n-th digital signature $\sigma_n$) from, for example, the certification authority server 9. Upon receiving the verification key from the verification key acquiring unit 77, the verifying unit 78 stores the verification key in the storage device, such as the main memory (STEP S41). The verifying unit 78 executes verification processing based on the n-th intermediate data $\alpha_n$, the n-th digital signature $\sigma_n$, and the n-th deletion index set data (STEP S43). The n-th deletion index set data does not exist when the digital signature $\sigma_n$ is that of the signer of the signer terminal 3. More specifically, the verifying unit 78 verifies the digital signature $\sigma_n$ with the verification key on the n-th intermediate data $\alpha_n$ and the deletion index set data.

If the verification fails (NO in STEP S45), the verifying unit 78 informs the output unit 79 of the verification failure. The output unit 79 outputs error information indicating the verification failure, for example, on a display device (STEP S47). When the verifier terminal 7 includes a printer or an audio output device, the output unit 79 may output the error using the printer or the audio output device. The processing then ends.

Figure 18:
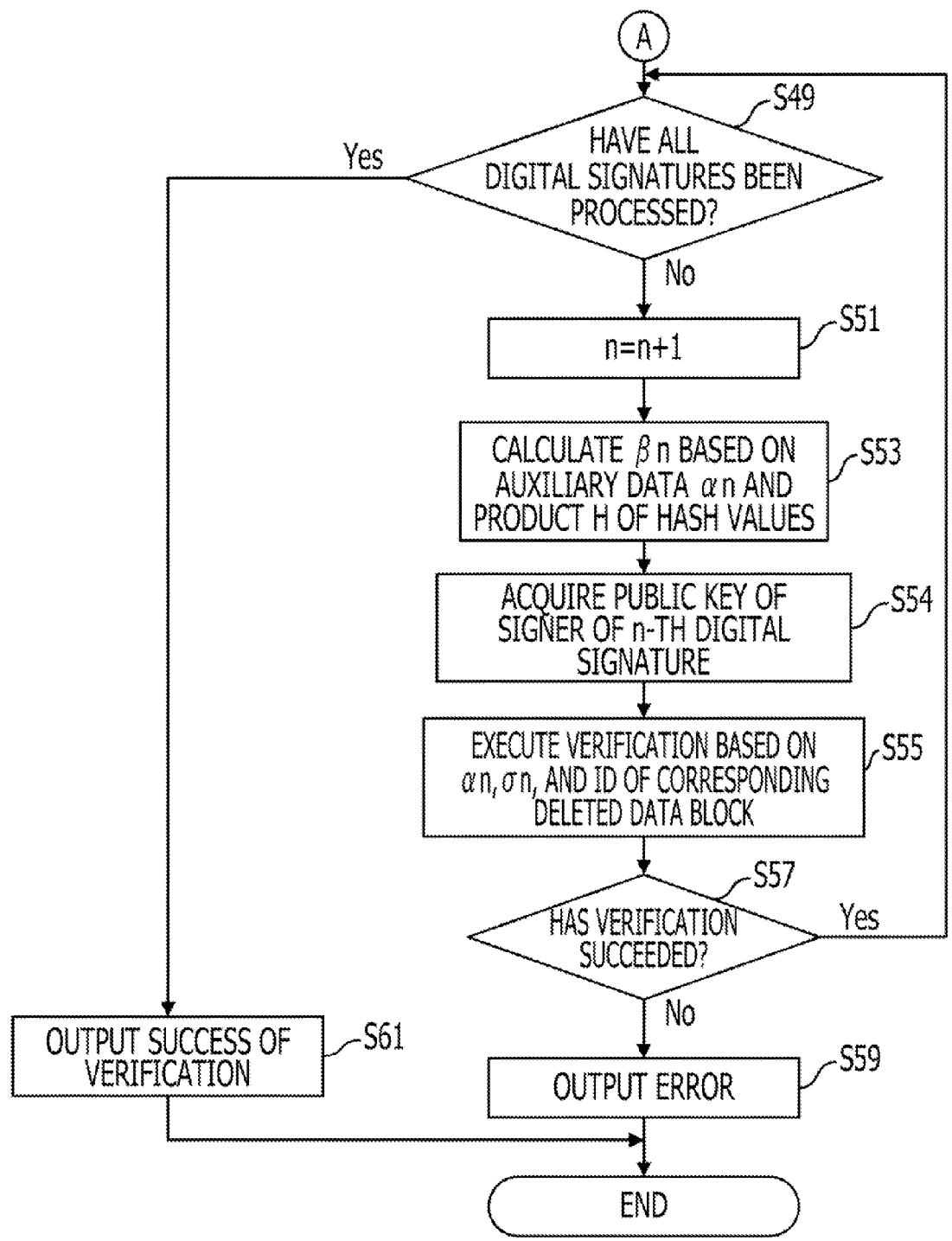
FIG. 18 is a flowchart illustrating processing in the verifier terminal.

If the verification succeeds (YES in STEP S45), the process continues to a processing flow illustrated in FIG. 18 through an indication A. At this time, a user having generated the verified digital signature $\sigma_n$ and the corresponding deletion index set data of the user may be output on the display device.

In the processing illustrated in FIG. 18, the verifying unit 78 determines whether the verification processing has been executed on all of the digital signatures stored in the received data storage unit 72 (STEP S49). If no unprocessed digital signature exists, the verifying unit 78 informs the output unit 79 of success of the verification. The output unit 79 then outputs the verification success on the display device (STEP S61). In this way, the modifier (i.e., a modifier) can be identified in addition to assuring the integrity of disclosed part and assuring the confidentiality of deleted part.

If an unprocessed digital signature exists, the verifying unit 78 increments the counter "n" by 1 (STEP S51). The verifying unit 78 calculates n-th intermediate data $\alpha_n = \beta_n^H \pmod{N}$ from the auxiliary data $\beta_n$ stored in the received data storage unit 72 and the product H of the hash values and stores the n-th intermediate data in the storage device, such as the main memory (STEP S53).

The verifying unit 78 also causes the verification key acquiring unit 77 to acquire a verification key of a signer of the n-th digital signature $\sigma_n$ (i.e., a user having generated the n-th digital signature $\sigma_n$) from, for example, the certification authority server 9. Upon receiving the verification key from the verification key acquiring unit 77, the verifying unit 78 stores the verification key in the storage device, such as the main memory (STEP S54). The verifying unit 78 executes verification processing based on the n-th intermediate data $\alpha_n$, the n-th digital signature $\sigma_n$, and the n-th deletion index set data (STEP S55). More specifically, the verifying unit 78 verifies the digital signature $\sigma_n$ with the verification key on the intermediate data and the deletion index set data (which does not exist if the digital signature $\sigma_n$ is of the signer).

If the verification fails (NO in STEP S57), the verifying unit 78 informs the output unit 79 of the verification failure. The output unit 79 outputs error information indicating the verification failure, for example, on the display device (STEP S59). The process then terminates.

If the verification succeeds (YES in STEP S57), the process returns to STEP S49. At this time, the user having generated the verified digital signature $\sigma_n$ and the corresponding deletion index set data of the user may be output on the display device.

In this way, the verifying unit 78 verifies the digital signatures in an order from the latest modifier to the oldest modifier, and at last the signer to determine whether the content data is not falsified.

Although the embodiments of this technology have been described above, this technology is not limited to the described embodiments. For example, although the functional block diagrams of the signer terminal 3, the modifier terminal 5, and the verifier terminal 7 are illustrated, configurations of such functional blocks may differ from the configurations of actual program modules.

The steps of the processing flow may be switched or executed in parallel as long as the processing result does not change.

The content data may include video data, audio data, image data, and other kinds of data as well as document data.

Figure 19:
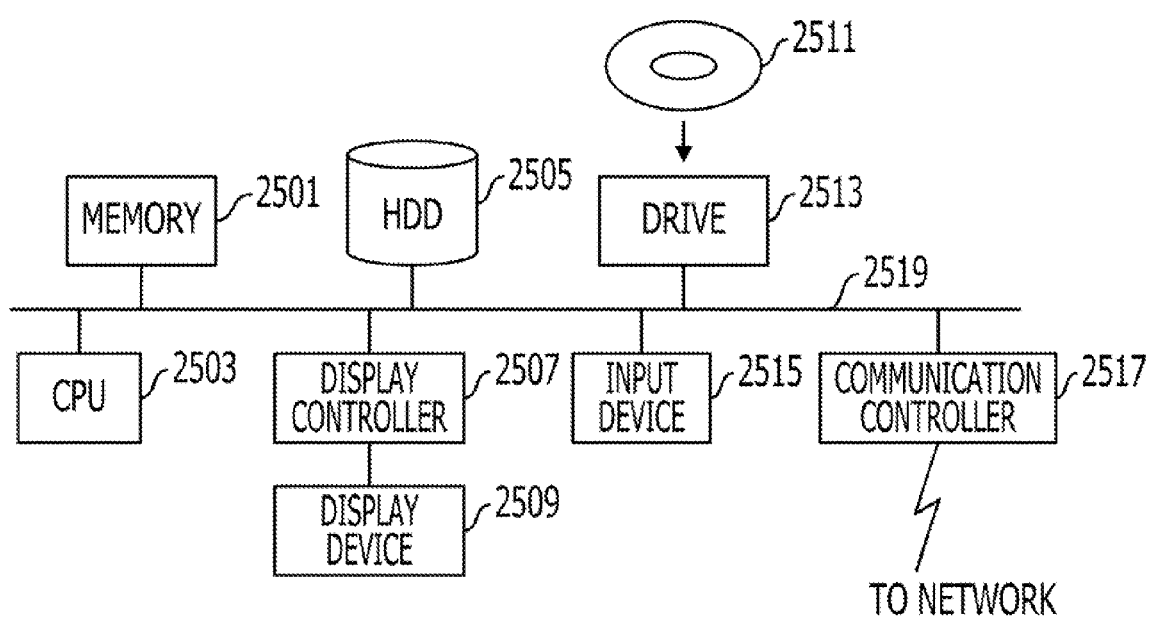
FIG. 19 is a functional block diagram of a computer.

Computers function as the signer terminal 3, the modifier terminal 5, and the verifier terminal 7 described above. As illustrated in FIG. 19, in the computer, a memory 2501, a central processing unit (CPU) 2503, a hard disk drive (HDD) 2505, a display controller 2507, a display device 2509, a drive 2513 for a removable disc 2511, an input device 2515, and a communication controller 2517 for coupling to a network may be coupled to each other through a bus 2519. The HDD 2505 stores an operating system (OS) and an application program for implementing the processing according to the embodiment. Before execution, the CPU 2503 reads the OS and the application program to the memory 2501 from the HDD 2505. The CPU 2503 controls the display controller 2507, the communication controller 2517, and the drive 2513 causing them to execute operations. Data being processed is stored in the memory 2501 and the HDD 2505 as needed. In one embodiment of this technology, the application program for implementing the above-described processing is recoded on the computer-readable removable disc 2511 and is distributed and installed in the HDD 2505 from the drive 2513. The application program may be installed in the HDD 2505 through the network such as the Internet, and the communication controller 2517. Hardware, such as the CPU 2503 and the memory 2501, the OS, and the application programs organically operate in cooperation, whereby such a computer realizes each of the foregoing functions.

The embodiment can be summarized as follows.

Figure 20:
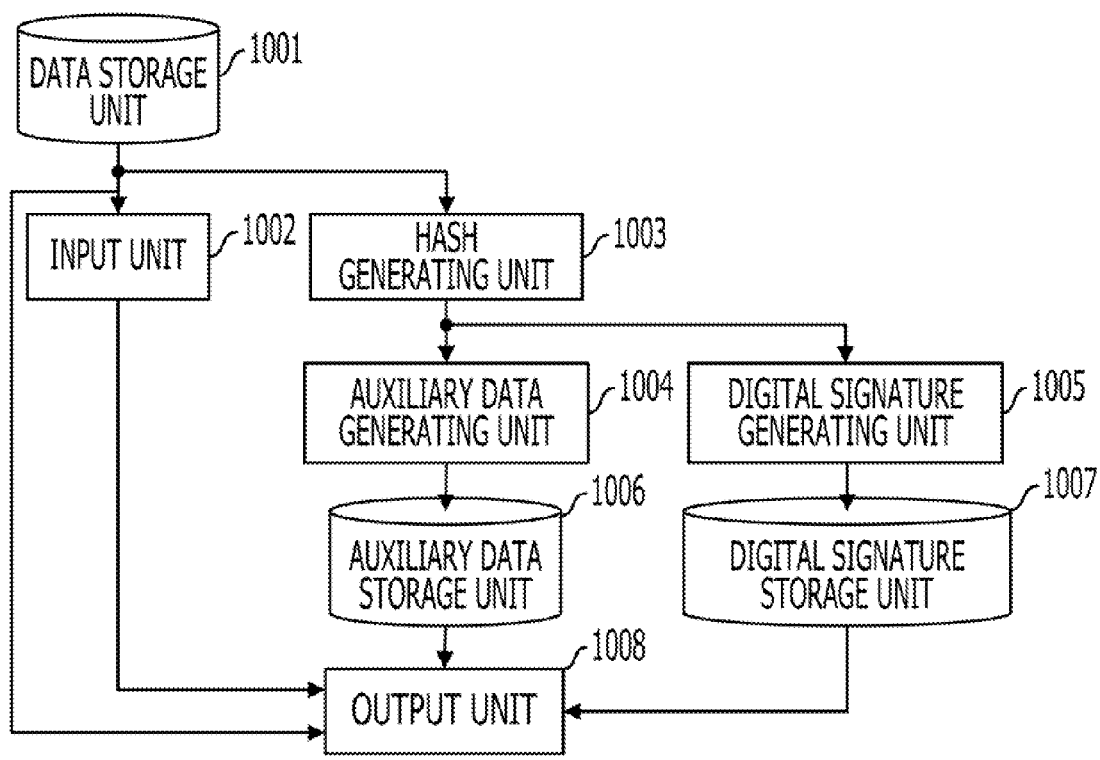
FIG. 20 is a functional block diagram of a first data processing apparatus.

A data processing apparatus according to a first embodiment of this embodiment includes: (A) an input unit (1002 in FIG. 20) configured to accept information on one or more deletion-target data blocks specified from a plurality of data blocks included in content data stored in a data storage unit (1001 in FIG. 20); (B) a hash generating unit (1003 in FIG.

20) configured to calculate a hash value of each of the plurality of data blocks; (C) an auxiliary data generating unit (1004 in FIG. 20) configured to calculate auxiliary data $\beta=g^{H1}(\mathrm{mod}\ N)$ of a signer based on predetermined values g and N and a product H1 of the hash values of one or more deletion-target data blocks of the plurality of the data blocks and to store the auxiliary data in an auxiliary data storage unit (1006 in FIG. 20); (D) a digital signature generating unit (1005 in FIG. 20) configured to calculate intermediate data $\alpha=g^{H2}(\mathrm{mod}\ N)$ based on the predetermined values g and N and a product H2 of the hash values of one or more remaining data blocks of the plurality of data blocks except for one or more deletion-target data blocks, to generate a digital signature for a combination of the intermediate data a and position data of one or more deletion-target data blocks with a signing key of a modifier, and to store the digital signature in a digital signature storage unit (1007 in FIG. 20); and (E) an output unit (1008 in FIG. 20) configured to output, to a specified output destination, the auxiliary data stored in the auxiliary data storage unit, the digital signature stored in the digital signature storage unit, the position data of one or more deletion-target data blocks, modified content data including one or more remaining data blocks of the content data stored in the data storage unit, and another digital signature stored in the data storage unit.

Since the auxiliary data generating unit and the digital signature generating unit are used, the volume of the output data does not greatly increase even when many data blocks are deleted. The volume of the position data of the deletion-target data blocks increases but the level of increase is permissible.

When the data storage unit stores previous auxiliary data $\beta_i$ and position data of one or more previously deleted data blocks, the auxiliary data generating unit may update the previous auxiliary data $\beta_i$ stored in the data storage unit to a value $\beta_i^{H1}(\mathrm{mod}\ N)$ based on the predetermined value N and the product H1 of the hash values of one or more deletion-target data blocks and stores the updated previous auxiliary data in the auxiliary data storage unit. The output unit may further output the updated previous auxiliary data stored in the auxiliary data storage unit and the position data of one or more previously deleted data blocks stored in the data storage unit. The volume of the output data increases as the number of modifiers increases, but the volume of the output data does not greatly increase in accordance with the number of the deletion-target data blocks.

Figure 21:
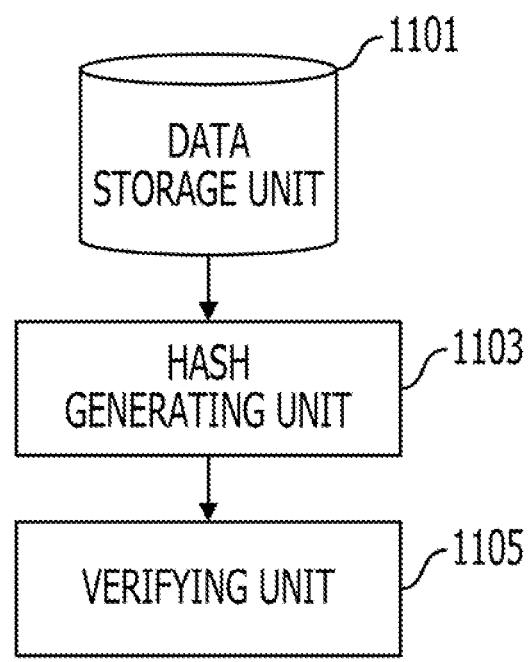
FIG. 21 is a functional block diagram of a second data processing apparatus.

A data processing apparatus according to a second embodiment of this embodiment includes: (A) a data storage unit (1101 in FIG. 21) configured to store modified content data, a second digital signature for the modified content data, first position data of one or more data blocks deleted from the original content data, a first digital signature for the original content data, and first auxiliary data $\beta$ of a first signer of the first digital signature for the original content data; (B) a hash generating unit (1103 in FIG. 21) configured to calculate a hash value of each data block included in the modified content data; and (C) a verifying unit (1105 in FIG. 21) configured to calculate first intermediate data $\alpha=g^{H1}(\mathrm{mod}\ N)$ based on predetermined values g and N and a product H1 of the calculated hash values and configured to verify the second digital signature for the modified content data with the first intermediate data $\alpha$, the first position data of one or more data blocks deleted from the original content data stored in the data storage unit, the second digital signature for the modified content data, and a verification key of a second signer (i.e., a user having generated the second digital signature, more specifically, a modifier) of the second digital signature. The verifying unit calculates, in response to success in the verification of the second digital signature for the modified content data, the second intermediate data $\alpha_2=\beta^{H1}(\mathrm{mod}\ N)$ based on the predetermined value N, the product H1 of the calculated hash values, and the first auxiliary data $\beta$ of the first signer of the first digital signature for the original content data and verifies the first digital signature for the original content data with the second intermediate data $\alpha_2$, a verification key of the first signer of the first digital signature for the original content data, and the first digital signature for the original content data (D).

In verification, the second intermediate data $\alpha_2$, i.e., a characteristic value of the content data sent to the modifier, is calculated using the auxiliary data and the product H1 of the hash values of the data blocks included in the modified content data. Accordingly, the digital signature of the original content data is easily verified.

The data storage unit may store a third digital signature of a previous modifier, second position data of one or more previously deleted data blocks, and second auxiliary data $\beta_2$ of the previous modifier. In such case, the verifying unit may calculate, in response to success in the verification of the second digital signature for the modified content data, third intermediate data $\alpha_3=\beta_2^{H1}(\mathrm{mod}\ N)$ based on the predetermined value N, the product H1 of the calculated hash values, and the second auxiliary data $\beta_2$ of the previous modifier and may verify the third digital signature of the previous modifier with the third intermediate data $\alpha_3$, the second position data of one or more previously deleted data blocks stored in the data storage unit, the third digital signature of the previous modifier, and a verification key of the previous modifier.

The data processing apparatus can handle a case where a plurality of modifiers exists. As described above, the volume of the data for use in the verification hardly increases even if the number of the deleted data blocks increase.

Figure 22:
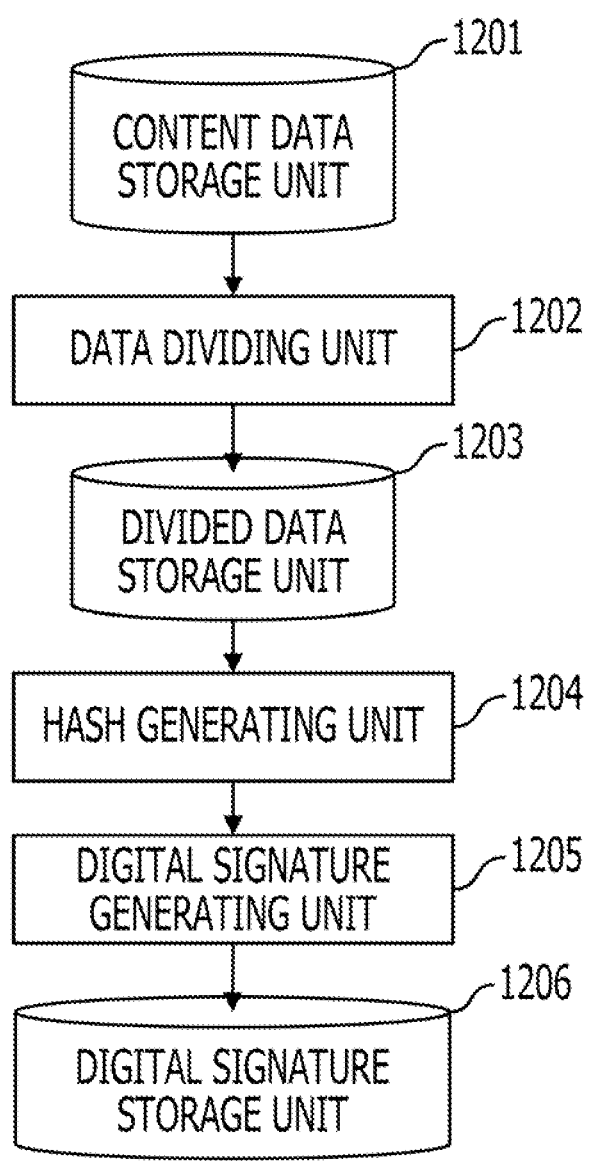
FIG. 22 is a functional block diagram of a third data processing apparatus.

A data processing apparatus according to a third embodiment includes: a data dividing unit (1202 in FIG. 22) configured to divide signature-target content data stored in a content data storage unit (1201 in FIG. 22) into a plurality of data blocks and to store the plurality of data blocks in a divided data storage unit (1203 in FIG. 22); a hash generating unit (1204 in FIG. 22) configured to calculate a hash value of each of the plurality of data blocks stored in the divided data storage unit; and a digital signature generating unit (1205 in FIG. 22) configured to calculate intermediate data $\alpha=g^{H}(\mathrm{mod}\ N)$ based on predetermined values g and N and a product H of the calculated hash values, to generate a digital signature for the intermediate data $\alpha$ with a signing key of a signer, and to store the digital signature in a digital signature storage unit (1206 in FIG. 22).

A program can be created that causes a computer to execute the foregoing processing. The program may be stored on a computer-readable storage medium or a storage device, such as a flexible disk, a CD-ROM, a magneto-optical disk, a semiconductor memory, and an HDD. The computer-readable storage medium or storage device used herein excludes a transitory propagation signal.

What is claimed is:

1. A data processing apparatus comprising:
a memory; and
a processor coupled to the memory and configured to:
accept information on one or more deletion-target data blocks specified from a plurality of data blocks included in content data,
calculate a hash value of each of the plurality of data blocks,
calculate auxiliary data $\beta=g^{H1}(\mathrm{mod}\ N)$ of a signer based on predetermined values g and N and a product H1 of the hash values of one or more deletion-target data blocks of the plurality of the data blocks, calculate intermediate data $\alpha=g^{H2}(\mod N)$ based on the predetermined values g and N and a product H2 of the hash values of one or more remaining data blocks of the plurality of data blocks except for one or more deletion-target data blocks, generate a digital signature for a combination of the intermediate data α and position data of one or more deletion-target data blocks with a signing key of a modifier, and output, to a specified output destination, the auxiliary data, the digital signature, the position data of one or more deletion-target data blocks, modified content data including one or more remaining data blocks of the content data, and another digital signature, wherein when previous auxiliary data $\beta_i$ and position data of one or more previously deleted data blocks are stored in the memory, update the previous auxiliary data $\beta_i$ to a value $\beta_i^{H1}(\mod N)$ based on the predetermined value N and the product H1 of the hash values of one or more deletion-target data blocks, and output the updated previous auxiliary data and the position data of one or more previously deleted data blocks.

2. A data processing apparatus comprising:

a memory; and a processor coupled to the memory and configured to:

store modified content data, a second digital signature for the modified content data, first position data of one or more data blocks deleted from the original content data, a first digital signature for the original content data, and first auxiliary data β of a first signer of the first digital signature for the original content data;

calculate a hash value of each data block included in the modified content data; and calculate first intermediate data $\alpha=g^{H1}(\mod N)$ based on predetermined values g and N and a product H1 of the calculated hash values and to verify the second digital signature for the modified content data with the first intermediate data α, the first position data of the one or more data blocks deleted from the original content data, the second digital signature for the modified content data, and a verification key of a second signer of the second digital signature, calculate, in response to success in the verification of the second digital signature for the modified content data, second intermediate data $\alpha_2=\beta^{H1}(\mod N)$ based on the predetermined value N, the product H1 of the calculated hash values, the first auxiliary data β of the first signer of the first digital signature for the original content data, and verify the first digital signature for the original content data with the second intermediate data $\alpha_2$, a verification key of the first signer of the first digital signature for the original content data, and the first digital signature for the original content data, wherein when the memory stores a third digital signature of a previous modifier, second position data of one or more previously deleted data blocks, and second auxiliary data $\beta_2$ of the previous modifier, calculate, in response to success in the verification of the second digital signature for the modified content data, third intermediate data $\alpha_3=\beta_2^{H1}(\mod N)$ based on the predetermined value N, the product H1 of the calculated hash values, and the second auxiliary data $\beta_2$ of the previous modifier, and verify the third digital signature of the previous modifier with the third intermediate data $\alpha_3$, the second position data of the one or more previously deleted data blocks, the third digital signature of the previous modifier, and a verification key of the previous modifier.

3. A data processing apparatus comprising:

a memory; and a processor coupled to the memory and configured to:

divide signature-target content data stored in the memory into a plurality of data blocks;

calculate a hash value of each of the plurality of data blocks; and calculate intermediate data $\alpha=g^H(\mod N)$ based on predetermined values g and N and a product H of the calculated hash values, to generate a digital signature for the intermediate data α with a signing key of a signer, and to store the digital signature in the memory, wherein when previous auxiliary data $\beta_i$ and position data of one or more previously deleted data blocks are stored in the memory, update the previous auxiliary data $\beta_i$ to a value $\beta_i^{H1}(\mod N)$ based on the predetermined value N and the product H of the hash values of one or more deletion-target data blocks, and output the updated previous auxiliary data and the position data of one or more previously deleted data blocks.

4. A digital signature method implemented in a computer, the digital signature method comprising:

dividing, by a processor, signature-target content data stored in a content data storage unit into a plurality of data blocks and storing the plurality of data blocks in a divided data storage unit;

calculating a hash value of each of the plurality of data blocks stored in the divided data storage unit; and calculating intermediate data $\alpha=g^H(\mod N)$ based on predetermined values g and N and a product H of the calculated hash values, generating a digital signature for the intermediate data α with a signing key of a signer, and storing the digital signature in a digital signature storage unit, wherein when the data storage unit stores previous auxiliary data δ, and position data of one or more previously deleted data blocks, updating the previous auxiliary data δ, stored in the data storage unit to a value $\beta_i^{H1}(\mod N)$ based on the predetermined value N and the product H1 of the hash values of one or more deletion-target data blocks and storing the updated previous auxiliary data in the auxiliary data storage unit, and further outputting the updated previous auxiliary data stored in the auxiliary data storage unit and the position data of one or more previously deleted data blocks stored in the data storage unit.

5. A digital signature method implemented in a computer, the digital signature method comprising:

accepting, by a processor, information on one or more deletion-target data blocks specified from a plurality of data blocks included in content data stored in a data storage unit;

calculating a hash value of each of the plurality of data blocks;

calculating auxiliary data $\beta=g^{H1}(\bmod N)$ of a signer based on predetermined values g and N and a product H1 of the hash values of one or more deletion-target data blocks of the plurality of the data blocks and storing the auxiliary data in an auxiliary data storage unit;

calculating intermediate data $\alpha=g^{H2}(\bmod N)$ based on the predetermined values g and N and a product H2 of the hash values of one or more remaining data blocks of the plurality of data blocks except for one or more deletion-target data blocks, generating a digital signature for a combination of the intermediate data α and position data of one or more deletion-target data blocks with a signing key of a modifier, and storing the digital signature in a digital signature storage unit; and outputting to a specified output destination, the auxiliary data stored in the auxiliary data storage unit, the digital signature stored in the digital signature storage unit, the position data of one or more deletion-target data blocks, modified content data including one or more remaining data blocks of the content data stored in the data storage unit, and another digital signature stored in the data storage unit, wherein when the data storage unit stores previous auxiliary data $\beta_i$ and position data of one or more previously deleted data blocks, updating the previous auxiliary data $\beta_i$ stored in the data storage unit to a value $\beta_i^{H1}(\bmod N)$ based on the predetermined value N and the product H1 of the hash values of one or more deletion-target data blocks and storing the updated previous auxiliary data in the auxiliary data storage unit, and further outputting the updated previous auxiliary data stored in the auxiliary data storage unit and the position data of one or more previously deleted data blocks stored in the data storage unit.

6. A digital signature verification method implemented in a computer, the digital signature method comprising:

calculating, by a processor, a hash value of each data block included in modified content data stored in a data storage unit that stores the modified content data, a second digital signature for the modified content data, first position data of one or more data blocks deleted from the original content data, a first digital signature for the original content data, and first auxiliary data β of a first signer of the first digital signature for the original content data;

calculating first intermediate data $\alpha=g^{H1}(\bmod N)$ based on predetermined values g and N and a product H1 of the calculated hash values and verifying the second digital signature for the modified content data with the first intermediate data α, the first position data of one or more data blocks deleted from the original content data stored in the data storage unit, the second digital signature for the modified content data, and a verification key of a second signer of the second digital signature;

calculating, in response to success in the verification of the second digital signature for the modified content data, second intermediate data $\alpha_2=\beta^{H1}(\bmod N)$ based on the predetermined value N, the product H1 of the calculated hash values, the first auxiliary data β of the first signer of the first digital signature for the original content data and verifying the first digital signature for the original content data with the second intermediate data $\alpha_2$, a verification key of the first signer of the first digital signature for the original content data, and the first digital signature for the original content data, wherein when the data storage unit further stores a third digital signature of a previous modifier, second position data of one or more previously deleted data blocks, and second auxiliary data $\beta_2$ of the previous modifier, calculating, in response to success in the verification of the second digital signature for the modified content data, third intermediate data $\alpha_3=\beta_2^{H1}(\bmod N)$ based on the predetermined value N, the product H1 of the calculated hash values, and the second auxiliary data $\beta_2$ of the previous modifier and verifying the third digital signature of the previous modifier with the third intermediate data $\alpha_3$, the second position data of one or more previously deleted data blocks stored in the data storage unit, the third digital signature of the previous modifier, and a verification key of the previous modifier.

7. A non-transitory computer-readable storage medium storing a program for causing a computer to execute a digital signature process comprising:

dividing signature-target content data stored in a content data storage unit into a plurality of data blocks and storing the plurality of data blocks in a divided data storage unit;

calculating a hash value of each of the plurality of data blocks stored in the divided data storage unit; and calculating intermediate data $\alpha=g^H(\bmod N)$ based on predetermined values g and N and a product H of the calculated hash values, generating a digital signature for the intermediate data α with a signing key of a signer, and storing the digital signature in a digital signature storage unit, wherein when the data storage unit stores previous auxiliary data $\beta_i$ and position data of one or more previously deleted data blocks, updating the previous auxiliary data $\beta_i$ stored in the data storage unit to a value $\beta_i^{H1}(\bmod N)$ based on the predetermined value N and the product H1 of the hash values of one or more deletion-target data blocks and storing the updated previous auxiliary data in the auxiliary data storage unit, and further outputting the updated previous auxiliary data stored in the auxiliary data storage unit and the position data of one or more previously deleted data blocks stored in the data storage unit.

8. A non-transitory computer-readable storage medium storing a program causing a computer to execute a digital signature process comprising:

accepting information on one or more deletion-target data blocks specified from a plurality of data blocks included in content data stored in a data storage unit;

calculating a hash value of each of the plurality of data blocks;

calculating auxiliary data $\beta=g^{H1}(\bmod N)$ of a signer based on predetermined values g and N and a product H1 of the hash values of one or more deletion-target data blocks of the plurality of the data blocks and storing the auxiliary data in an auxiliary data storage unit;

calculating intermediate data $\alpha=g^{H2}(\bmod N)$ based on the predetermined values g and N and a product H2 of the hash values of one or more remaining data blocks of the plurality of data blocks except for one or more deletion-target data blocks, generating a digital signature for a combination of the intermediate data a and position data of one or more deletion-target data blocks with a signing key of a modifier, and storing the digital signature in a digital signature storage unit; and outputting, to a specified output destination, the auxiliary data stored in the auxiliary data storage unit, the digital signature stored in the digital signature storage unit, the position data of one or more deletion-target data blocks, modified content data including one or more remaining data blocks of the content data stored in the data storage unit, and another digital signature stored in the data storage unit, wherein when the data storage unit stores previous auxiliary data $\beta_i$ and position data of one or more previously deleted data blocks, updating the previous auxiliary data $\beta_i$ stored in the data storage unit to a value $\beta_i^{H1}$ (mod N) based on the predetermined value N and the product H1 of the hash values of one or more deletion-target data blocks and storing the updated previous auxiliary data in the auxiliary data storage unit, and further outputting the updated previous auxiliary data stored in the auxiliary data storage unit and the position data of one or more previously deleted data blocks stored in the data storage unit.

9. A non-transitory computer-readable storage medium storing a program causing a computer to execute a digital signature verification process comprising:

calculating a hash value of each data block included in modified content data stored in a data storage unit that stores the modified content data, a second digital signature for the modified content data, first position data of one or more data blocks deleted from the original content data, a first digital signature for the original content data, and first auxiliary data $\beta$ of a first signer of the first digital signature for the original content data;

calculating first intermediate data $\alpha = g^{H1}$ (mod N) based on predetermined values g and N and a product H1 of the calculated hash values and verifying the second digital signature for the modified content data with the first intermediate data $\alpha$, the first position data of one or more data blocks deleted from the original content data stored in the data storage unit, the second digital signature for the modified content data, and a verification key of a second signer of the second digital signature;

calculating, in response to success in the verification of the second digital signature for the modified content data, second intermediate data $\alpha_2 = \beta^{H1}$ (mod N) based on the predetermined value N, the product H1 of the calculated hash values, the first auxiliary data $\beta$ of the first signer of the first digital signature for the original content data and verifying the first digital signature for the original content data with the second intermediate data $\alpha_2$, a verification key of the first signer of the first digital signature for the original content data, and the first digital signature for the original content data, wherein when the data storage unit further stores a third digital signature of a previous modifier, second position data of one or more previously deleted data blocks, and second auxiliary data $\beta_2$ of the previous modifier, calculating, in response to success in the verification of the second digital signature for the modified content data, third intermediate data $\alpha_3 = \beta_2^{H1}$ (mod N) based on the predetermined value N, the product H1 of the calculated hash values, and the second auxiliary data $\beta_2$ of the previous modifier and verifying the third digital signature of the previous modifier with the third intermediate data $\alpha_3$, the second position data of one or more previously deleted data blocks stored in the data storage unit, the third digital signature of the previous modifier, and a verification key of the previous modifier.

* * * * *